US011861049B2

United States Patent
Venkataramani et al.

(10) Patent No.: US 11,861,049 B2
(45) Date of Patent: Jan. 2, 2024

(54) SYSTEM AND METHOD FOR DEFENSE AGAINST CACHE TIMING CHANNEL ATTACKS USING CACHE MANAGEMENT HARDWARE

(71) Applicant: The George Washington University, Washington, DC (US)

(72) Inventors: Guru Prasadh V. Venkataramani, Fairfax, VA (US); Milos Doroslovacki, Washington, DC (US); Fan Yao, Orlando, FL (US); Hongyu Fang, North Bethesda, MD (US)

(73) Assignee: The George Washington University, Washington, DC (US)

( * ) Notice: Subject to any disclaimer, the term of this patent is extended or adjusted under 35 U.S.C. 154(b) by 509 days.

(21) Appl. No.: 16/774,826

(22) Filed: Jan. 28, 2020

(65) Prior Publication Data
US 2020/0242275 A1    Jul. 30, 2020

Related U.S. Application Data

(60) Provisional application No. 62/798,764, filed on Jan. 30, 2019.

(51) Int. Cl.
*G06F 21/75*    (2013.01)
*G06F 12/0846*    (2016.01)
(Continued)

(52) U.S. Cl.
CPC .......... *G06F 21/75* (2013.01); *G06F 12/0848* (2013.01); *G06F 21/554* (2013.01);
(Continued)

(58) Field of Classification Search
CPC .... G06F 21/75; G06F 21/554; G06F 12/0848; G06F 17/141; G06F 2212/604; G06F 2212/601; G06F 2221/033; G06N 5/04
See application file for complete search history.

(56) References Cited

U.S. PATENT DOCUMENTS 10,116,436 B1 * 10/2018 Kodalapura ............ G06F 21/79
10,706,147 B1 *  7/2020 Pohlack .............. H04L 63/1416
(Continued)

OTHER PUBLICATIONS

Bazm, M-M. et al., "Cache-Based Side-Channel Attacks Detection through Intel Cache Monitoring Technology and Hardware Performance Counters," 2018 Third International Conference on Fog and Mobile Edge Computing (FMEC), Apr. 23-26, 2018, Barcelona, Spain, IEEE, pp. 7-12.
(Continued)

*Primary Examiner* — Saleh Najjar
*Assistant Examiner* — Devin E Almeida
(74) *Attorney, Agent, or Firm* — Withrow & Terranova, P.L.L.C.

(57) ABSTRACT

A system and method for defense against cache timing channel attacks using cache management hardware is provided. Sensitive information leakage is a growing security concern exacerbated by shared hardware structures in computer processors. Recent studies have shown how adversaries can exploit cache timing channel attacks to exfiltrate secret information. To effectively guard computing systems against such attacks, embodiments disclosed herein provide practical defense techniques that are readily deployable and introduce only minimal performance overhead. In this regard, a new protection framework against cache timing channel attacks is provided herein by leveraging commercial off-the-shelf (COTS) hardware support in processor caches, including last level caches (LLC), for cache monitoring and partitioning. This framework applies signal processing techniques on per-domain cache occupancy data to identify suspicious application contexts. Dynamic way partitioning is then used to disband domains that are involved in timing channels

19 Claims, 15 Drawing Sheets

(51) Int. Cl.
*G06F 21/55* (2013.01)
*G06N 5/04* (2023.01)
*G06F 17/14* (2006.01)

(52) U.S. Cl.
CPC ............ *G06N 5/04* (2013.01); *G06F 17/141* (2013.01); *G06F 2212/601* (2013.01); *G06F 2212/604* (2013.01); *G06F 2221/033* (2013.01)

(56) References Cited

U.S. PATENT DOCUMENTS

| | | | | |
|---|---|---|---|---|
| 2007/0067840 | A1* | 3/2007 | Young | G06F 21/554 726/22 |
| 2008/0133842 | A1* | 6/2008 | Raikin | G06F 12/1491 711/145 |
| 2008/0155679 | A1* | 6/2008 | Sebot | G06F 21/74 726/16 |
| 2009/0010424 | A1* | 1/2009 | Qi | G06F 21/572 380/28 |
| 2013/0097708 | A1* | 4/2013 | Jayanthi | G06F 21/554 726/25 |
| 2015/0082434 | A1* | 3/2015 | Sethumadhavan | G06F 21/755 726/23 |
| 2016/0140052 | A1* | 5/2016 | Waldspurger | G06F 12/121 711/136 |
| 2017/0094377 | A1* | 3/2017 | Herdrich | H04Q 9/02 |
| 2018/0046808 | A1* | 2/2018 | Cammarota | G06F 21/556 |
| 2019/0042454 | A1* | 2/2019 | Kantecki | G06F 12/0804 |
| 2019/0042739 | A1* | 2/2019 | Browne | G06F 21/554 |

OTHER PUBLICATIONS

Chen, J. et al., "CC-Hunter: Uncovering Covert Timing Channels on Shared Processor Hardware," 2014 47th Annual IEEE/ACM International Symposium on Microarchitecture, Dec. 13-17, 2014, Cambridge, UK, IEEE, pp. 216-228.

Demme, J. et al., "On the Feasibility of Online Malware Detection with Performance Counters," Proceedings of the 40th Annual International Symposium on Computer Architecture (ISCA '13), Jun. 2013, ACM, pp. 559-570.

Fang, H. et al., "Prefetch-guard: Leveraging hardware prefetchers to defend against cache timing channels," 2018 IEEE International Symposium on Hardware Oriented Security and Trust (HOST), Apr. 30-May 4, 2018, Washington, DC, USA, IEEE, pp. 187-190.

Gullasch, D. et al., "Cache Games—Bringing Access-Based Cache Attacks on AES to Practice," 2011 IEEE Symposium on Security and Privacy, May 22-25, 2011, Oakland, CA, IEEE Computer Society, pp. 490-505.

Hunger, C. et al., "Understanding Contention-Based Channels and Using Them for Defense," 2015 IEEE 21st International Symposium on High Performance Computer Architecture (HPCA), Feb. 7-11, 2015, Burlingame, CA, IEEE, pp. 639-650.

Kiriansky, V. et al., "DAWG: A Defense Against Cache Timing Attacks in Speculative Execution Processors," 2018 51st Annual IEEE/ACM International Symposium on Microarchitecture (MICRO), Oct. 20-24, 2018, Fukuoka, Japan, IEEE, pp. 974-987.

Liu, F. et al., "CATalyst: Defeating Last-Level Cache Side Channel Attacks in Cloud Computing," 2016 IEEE International Symposium on High Performance Computer Architecture (HPCA), Mar. 12-16, 2016, Barcelona, Spain, IEEE, pp. 406-418.

Liu, F. et al., "Last-Level Cache Side-Channel Attacks are Practical," 2015 IEEE Symposium on Security and Privacy, May 17-21, 2015, San Jose, CA, USA, IEEE Computer Society, pp. 605-622.

Liu, F. et al., "Random Fill Cache Architecture," 2014 47th Annual IEEE/ACM International Symposium on Microarchitecture, Dec. 13-17, 2014, Cambridge, UK, IEEE, pp. 203-215.

Ristenpart, T. et al., "Hey, You, Get Off of My Cloud: Exploring Information Leakage in Third-Party Compute Clouds," Proceedings of the 16th ACM Conference on Computer and Communications Security (CCS'09), Nov. 9-13, 2009, Chicago, Illinois, ACM, pp. 199-212.

Percival, C., "Cache Missing for Fun and Profit," Proceedings of BSDCan 2005, May 13-14, 2005, Ottowa, Canada, 13 pages.

Venkataramani, G. et al., "Detecting Hardware Covert Timing Channels," IEEE Micro, vol. 36, Issue 5, Sep.-Oct. 2016, IEEE Computer Society, pp. 17-27.

Wu, Z. et al., "Whispers in the Hyper-Space: High-Bandwidth and Reliable Covert Channel Attacks Inside the Cloud," IEEE/ACM Transactions on Networking, vol. 23, No. 2, Apr. 2015, IEEE, pp. 603-615.

Yan, M. et al., "ReplayConfusion: Detecting Cache-based Covert Channel Attacks Using Record and Replay," 2016 49th Annual IEEE/ACM International Symposium on Microarchitecture (MICRO), Oct. 15-19, 2016, Taipei, Taiwan, IEEE, 14 pages.

Yan, M. et al., "Secure Hierarchy-Aware Cache Replacement Policy (SHARP): Defending Against Cache-Based Side Channel Attacks," 2017 ACM/IEEE 44th Annual International Symposium on Computer Architecture (ISCA), Jun. 24-28, 2017, Toronto, ON, Canada, IEEE, pp. 347-360.

Yao, F. et al., "COTSknight: Practical Defense against Cache Timing Channel Attacks using Cache Monitoring and Partitioning Technologies," 2019 IEEE International Symposium on Hardware Oriented Security and Trust (HOST), May 5-10, 2019, McLean, VA, USA, IEEE, 10 pages.

Zhou, Y. et al., "SecDep: A User-Aware Efficient Fine-Grained Secure Deduplication Scheme with Multi-Level Key Management," 2015 31st Symposium on Mass Storage Systems and Technologies (MSST), May 30-Jun. 5, 2015, Santa Clara, CA, IEEE, 14 pages.

* cited by examiner

| CLOS NO. | CAPACITY BITMASK | WAY ALLOCATION |
|---|---|---|
| CLOS0 | IA32_L3_MASK_n_MSR[31:0]: 0xFFFF | 1 1 1 1 1 1 1 1 1 1 1 1 1 1 1 1 |
| CLOS1 | IA32_L3_MASK_n_MSR[31:0]: 0xF000 | 1 1 1 1 0 0 0 0 0 0 0 0 0 0 0 0 |
| CLOS2 | IA32_L3_MASK_n_MSR[31:0]: 0x0F00 | 0 0 0 0 1 1 1 1 0 0 0 0 0 0 0 0 |
| CLOS3 | IA32_L3_MASK_n_MSR[31:0]: 0x00F0 | 0 0 0 0 0 0 0 0 1 1 1 1 0 0 0 0 |

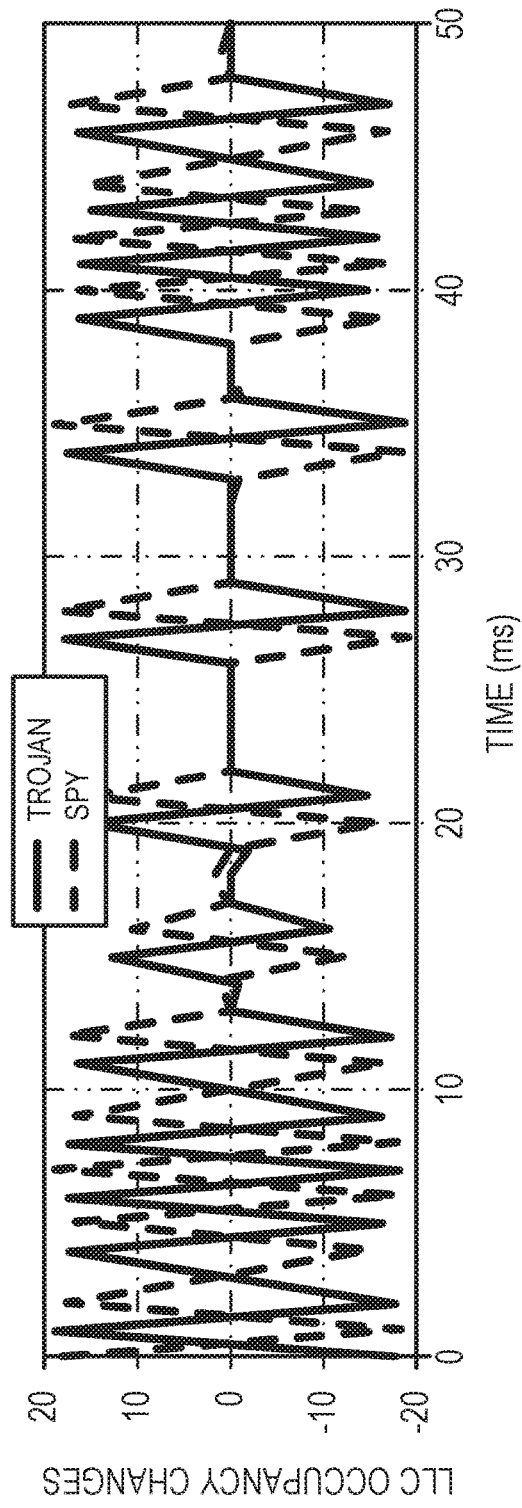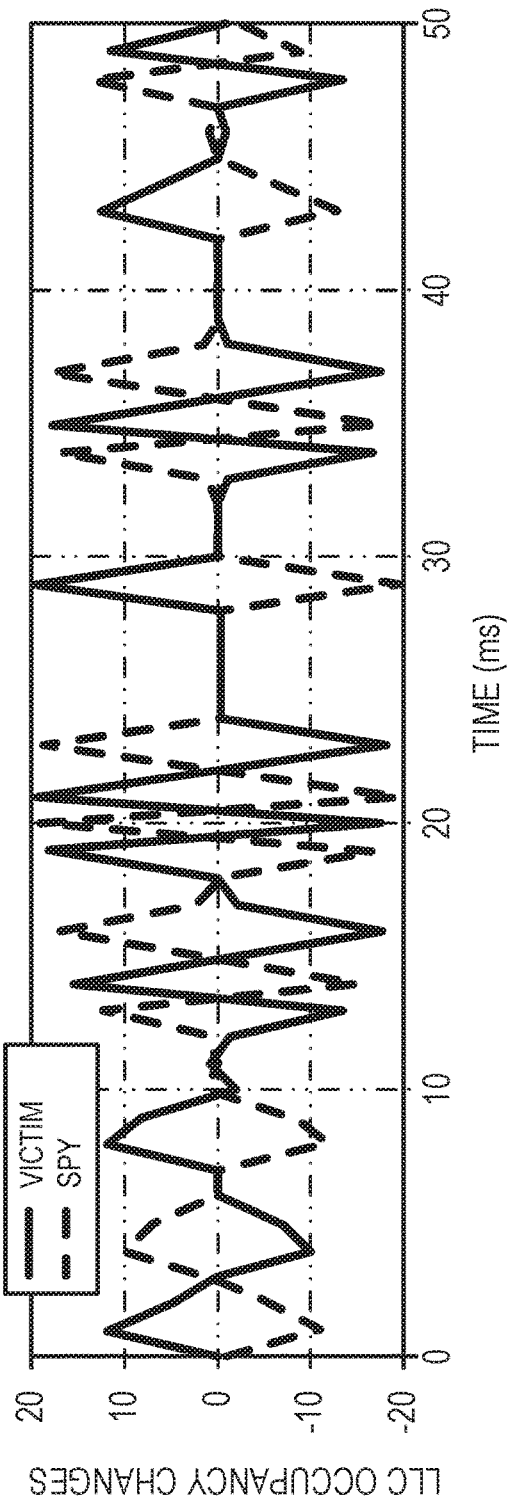
FIG. 6A
FIG. 6B

SYSTEM AND METHOD FOR DEFENSE AGAINST CACHE TIMING CHANNEL ATTACKS USING CACHE MANAGEMENT HARDWARE

RELATED APPLICATIONS

This application claims the benefit of provisional patent application Ser. No. 62/798,764, filed Jan. 30, 2019, the disclosure of which is hereby incorporated herein by reference in its entirety.

GOVERNMENT SUPPORT

This invention was made with government funds under grant number CNS-1618786 awarded by the National Science Foundation. The U.S. Government may have rights in this invention.

FIELD OF THE DISCLOSURE

This disclosure relates to detection and protection against computer security attacks, and more particularly to detection and protection against cache timing channel attacks.

BACKGROUND

With advances in computing, such as multi-core processing and cloud computing, computer security concerns have grown as attackers develop more sophisticated approaches to compromising protected information. Timing channels are a form of information leakage attack where an adversary modulates and/or observes access timing to shared resources in order to exfiltrate protected information. Among various hardware-based information leakage attacks, cache timing channels have become notorious, since caches present the largest on-chip attack surface for adversaries to exploit, combined with high bandwidth transfers.

Previously proposed detection and defense techniques against cache timing attacks either explore hardware modifications or incur non-trivial performance overheads. For more effective system protection and wide scale deployment, it is critical to explore ready-to-use and performance-friendly practical protection against cache timing channel attacks.

SUMMARY

A system and method for defense against cache timing channel attacks using cache management hardware is provided. Sensitive information leakage is a growing security concern exacerbated by shared hardware structures in computer processors. Recent studies have shown how adversaries can exploit cache timing channel attacks to exfiltrate secret information. To effectively guard computing systems against such attacks, embodiments disclosed herein provide practical defense techniques that are readily deployable and introduce only minimal performance overhead. In this regard, a new protection framework is provided herein that makes use of commercial off-the-shelf (COTS) hardware to identify and thwart cache timing channels.

It is observed herein that cache block replacements by adversaries in cache timing channels lead to a distinctive pattern in cache occupancy profiles. Such patterns are a strong indicator of the presence of timing channels. Embodiments disclosed herein leverage cache monitoring (e.g., Intel's Cache Monitoring Technology (CMT), available in recent server-class processors) to perform fine-grained monitoring of cache (e.g., last level cache (LLC)) occupancy for individual application domains. Suspicious application domains are identified, such as by applying signal processing techniques that characterize the communication strength of spy processes in cache timing channels. In some examples, cache way allocation (e.g., Intel's Cache Allocation Technology) is repurposed as a secure cache manager to dynamically partition the cache for suspicious application domains and disband any timing channel activity. This approach avoids pre-emptively separating application domains and consequently does not result in high performance overheads to benign application domains.

An exemplary embodiment provides a method for identifying a cache timing channel attack based on cache occupancy. The method includes monitoring cache occupancy for a set of application processes operating in a processor to produce cache occupancy data over a period of time. The method further includes analyzing the cache occupancy data to identify a potential cache timing channel attack.

Another exemplary embodiment provides a method for identifying a cache timing channel attack. The method includes receiving cache occupancy data for a set of application domains occupying a cache in a processor. The method further includes performing a pair-wise analysis of the set of application domains based on the cache occupancy data. The method further includes identifying a potential cache timing channel attack from the pair-wise analysis.

Another exemplary embodiment provides a system for defense against timing channel attacks. The system includes a cache occupancy monitor configured to produce cache occupancy data tracking a number of cache blocks occupied by each of a plurality of application processes. The occupancy pattern analyzer is configured to analyze the cache occupancy data to identify a potential cache timing channel attack.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6A is a graphical representation of an exemplary LLC occupancy trace for a trojan and spy pair in a covert channel with a serial protocol and on-off encoding.

FIG. 6B is a graphical representation of an exemplary LLC occupancy trace for a side channel with a victim and spy pair in a parallel protocol and pulse-position encoding.

DETAILED DESCRIPTION

Figure 1A:
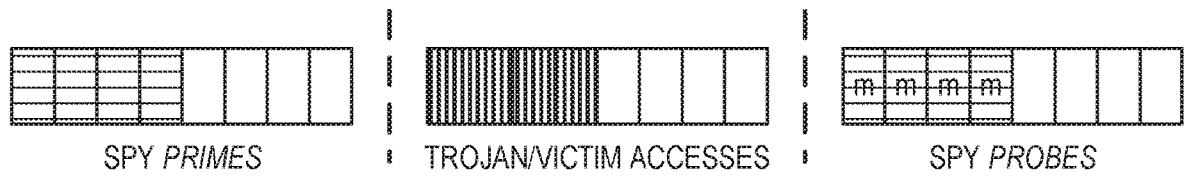
FIG. 1A is a graphical representation of a cache timing channel attack with on-off encoding, illustrating a cache miss profile of applications over time.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A system and method for defense against cache timing channel attacks using cache management hardware is provided. Sensitive information leakage is a growing security concern exacerbated by shared hardware structures in computer processors. Recent studies have shown how adversaries can exploit cache timing channel attacks to exfiltrate secret information. To effectively guard computing systems against such attacks, embodiments disclosed herein provide practical defense techniques that are readily deployable and introduce only minimal performance overhead. In this regard, a new protection framework is provided herein that makes use of commercial off-the-shelf (COTS) hardware to identify and thwart cache timing channels.

It is observed herein that cache block replacements by adversaries in cache timing channels lead to a distinctive pattern in cache occupancy profiles. Such patterns are a strong indicator of the presence of timing channels. Embodiments disclosed herein leverage cache monitoring (e.g., Intel's Cache Monitoring Technology (CMT), available in recent server-class processors) to perform fine-grained monitoring of cache (e.g., last level cache (LLC)) occupancy for individual application domains. Suspicious application domains are identified, such as by applying signal processing techniques that characterize the communication strength of spy processes in cache timing channels. In some examples, cache way allocation (e.g., Intel's Cache Allocation Technology) is repurposed as a secure cache manager to dynamically partition the cache for suspicious application domains and disband any timing channel activity. This approach avoids preemptively separating application domains and consequently does not result in high performance overheads to benign application domains.

I. Timing Channel Attacks

The term "timing channel" is used herein to denote a class of attacks that rely on timing modulation using a shared resource (e.g., a cache, such as LLC). Cache timing channels can manifest either as side or covert channels. There are typically two processes involved in cache timing channels: a trojan and spy in covert channels, and victim and spy in side channels. The term "trojan," as used herein, refers generally to trojans in covert channels as well as victims in side channels unless otherwise noted. Since direct communication between these pairs is explicitly prohibited by the underlying system security policy, the spy process turns to infer secrets by observing the modulated latencies during cache accesses, as further explained below with reference to FIGS. 1A-1D.

Cache timing channel protocols can be categorized along two dimensions: time and space. In the time dimension, (1) serial protocols operate by time-interleaving the cache accesses by the trojan and spy in a round-robin fashion (note that such serial protocols are more conducive to covert channels where the trojan can explicitly control synchronization); and (2) parallel protocols do not enforce any strict ordering of cache accesses between the trojan and spy, and let the spy decode the bits in parallel (observed more commonly in side channels). The spy generally takes multiple measurements to eliminate bit errors due to concurrent accesses.

In the space dimension, the attacks can be classified based on the encoding scheme used to communicate secrets: (1) On-off encoding works by manipulating the cache access latencies of a single group of cache sets; and (2) pulse position encoding uses multiple groups of cache sets. Both encoding schemes, using a prime+probe approach, are demonstrated in FIGS. 1A-1D. These encoding schemes can operate simply by creating cache conflict misses with their own (private) data blocks.

Figure 1B:
FIG. 1B is a graphical representation of a cache timing channel attack with on-off encoding, illustrating a cache hit profile of applications over time.

FIG. 1A is a graphical representation of a cache timing channel attack with on-off encoding, illustrating a cache miss profile of applications over time. FIG. 1B is a graphical representation of a cache timing channel attack with on-off encoding, illustrating a cache hit. In cache timing channels with on-off encoding, the trojan and spy contend on a single group of cache sets (e.g., the first 4 blocks in FIGS. 1A and 1B). During the prime phase, the spy fills cache sets with its own data (blocks with horizontal lines). The trojan either 1) accesses the same group of cache sets to fill them with its own data (illustrated in FIG. 1A using blocks with vertical lines), or 2) remains idle and the spy's contents are left intact (illustrated in FIG. 1B). The spy probes these cache blocks and measures access latencies. Longer latency values indicate cache conflict misses (marked as m in FIG. 1A), while shorter latencies indicate cache hits (marked as h in FIG. 1B). Secret bits are deciphered based on these cache latencies.

Figure 1C:
FIG. 1C is a graphical representation of a cache timing channel attack with pulse-position encoding using odd cache sets.
Figure 1D:
FIG. 1D is a graphical representation of a cache timing channel attack with pulse-position encoding using even cache sets.

FIG. 1C is a graphical representation of a cache timing channel attack with pulse-position encoding using odd cache sets. FIG. 1D is a graphical representation of a cache timing channel attack with pulse-position encoding using even cache sets. In cache timing channels with pulse-position encoding, the trojan and spy exploit two distinct groups of cache sets to communicate the bits. Initially, the spy primes both groups of cache sets by filling all of the ways with its own data. The trojan may either replace contents in the first (odd, illustrated in FIG. 1C) or second (even, illustrated in FIG. 1D) group of cache sets. The spy probes both groups of cache sets, and depending on the group with higher cache access latency, the secret bits are decoded. This encoding scheme can be generalized to multi-bit symbols when multiple groups of cache sets are chosen for communication.

Figure 2A:
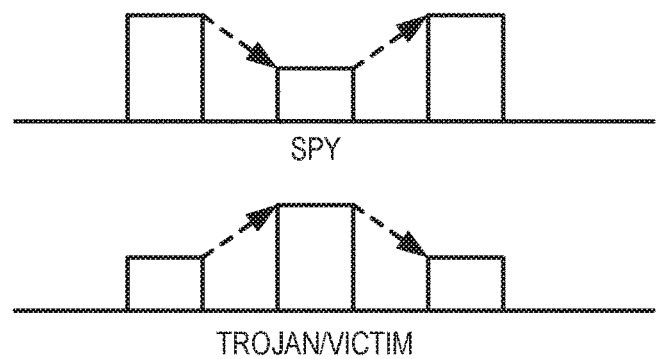
FIG. 2A is a graphical representation of cache occupancy changes for the cache timing channel attack of FIG. 1A.
Figure 2B:
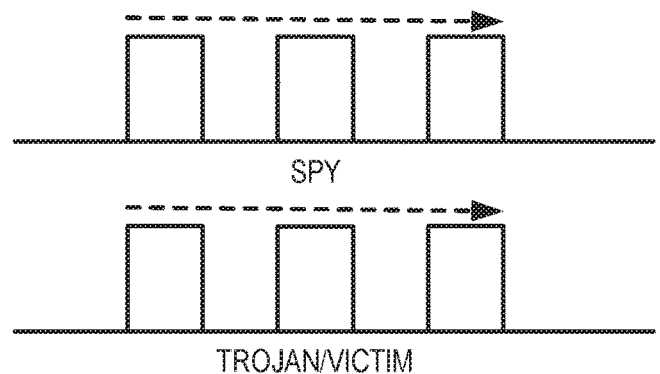
FIG. 2B is a graphical representation of cache occupancy changes for the cache timing channel attack of FIG. 1B.

FIG. 2A is a graphical representation of cache occupancy changes for the cache timing channel attack of FIG. 1A. In on-off encoding, when the trojan accesses the cache (e.g., LLC), the trojan's cache occupancy should first increase (due to the trojan fetching its cache blocks) and then decrease (during the spy's probe phase when trojan-owned blocks are replaced). Similarly, the spy's cache footprint would first decrease (due to the trojan filling in the cache blocks) and then increase (when the spy probes and fills the cache with its own data). FIG. 2B is a graphical representation of cache occupancy changes for the cache timing channel attack of FIG. 1B. When the trojan doesn't access the cache, neither of the processes change their respective LLC occupancies.

Figure 2C:
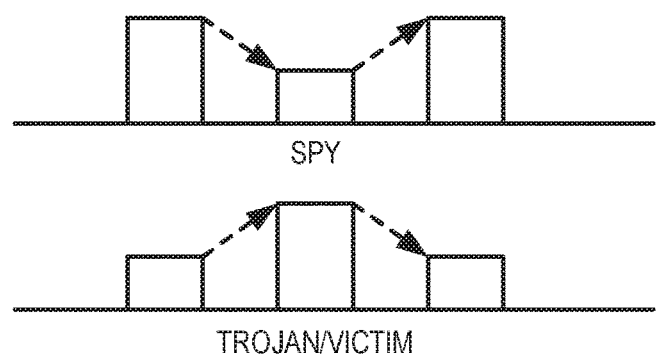
FIG. 2C is a graphical representation of cache occupancy changes in odd sets for the cache timing channel attack of FIG. 1C.
Figure 2D:
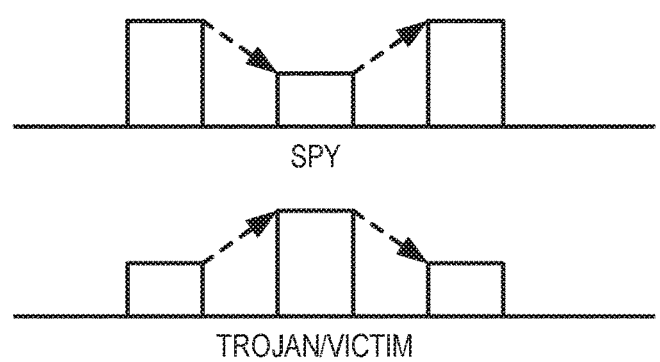
FIG. 2D is a graphical representation of cache occupancy changes in even sets for the cache timing channel attack of FIG. 1D.

FIG. 2C is a graphical representation of cache occupancy changes in odd sets for the cache timing channel attack of FIG. 1C. FIG. 2D is a graphical representation of cache occupancy changes in even sets for the cache timing channel attack of FIG. 1D. Under pulse-position encoding, regardless of the trojan's activity, a seesaw (swing) pattern is observed in their LLC occupancies.

Figure 3A:
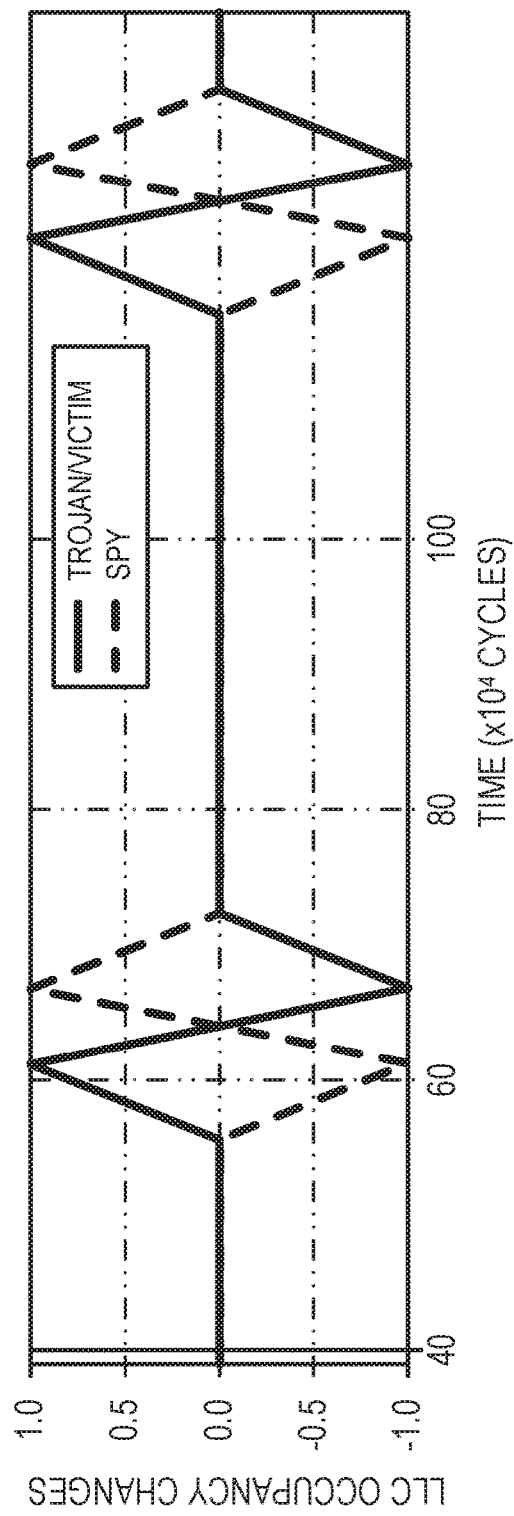
FIG. 3A is a graphical representation of an exemplary last level cache (LLC) occupancy rate of change for a trojan and spy pair.

FIG. 3A is a graphical representation of an exemplary LLC occupancy rate of change for a trojan and spy pair. FIG. 3A shows a representative window capturing the rate of change in LLC occupancy over time (illustrated in number of cycles). Due to the timing channel, the trojan's cache occupancy gains in proportion to the spy's loss, and vice versa.

Besides timing channel variants in the space dimension, note that this phenomenon exists along the time dimension as well. In a parallel protocol, since the spy decodes a single bit with multiple measurements, there will be a cluster of such swing patterns during every bit transmission, whereas serial protocols will likely show a single swing pattern.

Figure 3B:
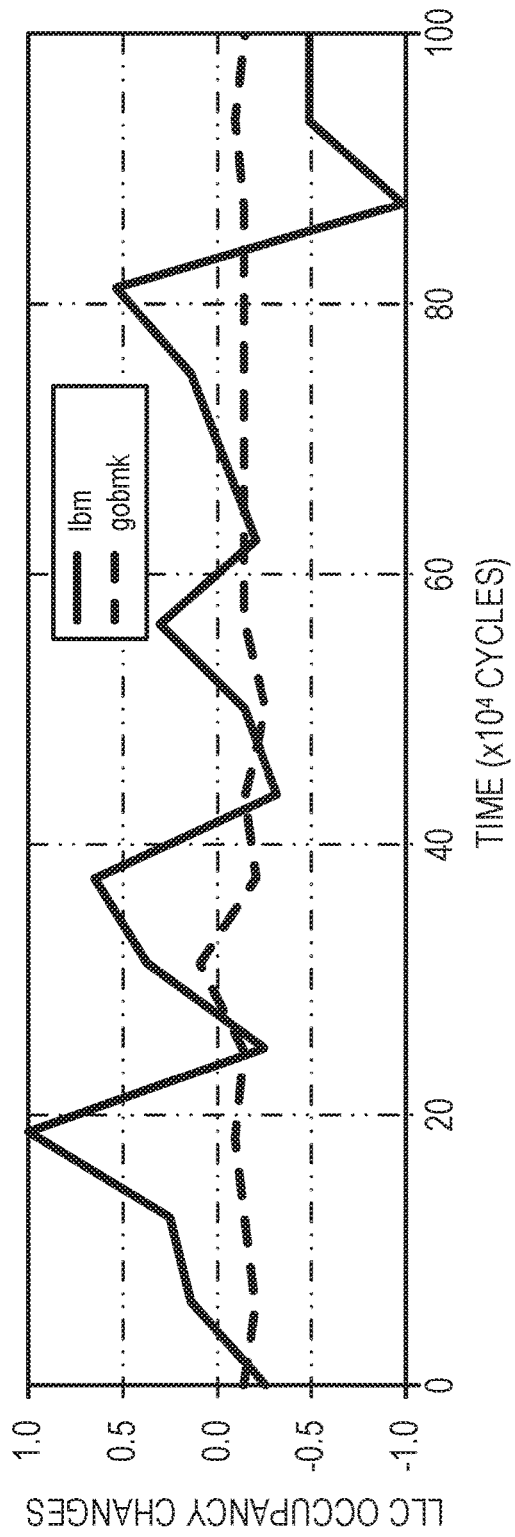
FIG. 3B is a graphical representation of an exemplary LLC occupancy rate of change for a benign application pair.

FIG. 3B is a graphical representation of an exemplary LLC occupancy rate of change for a benign application pair. FIG. 3A can be contrasted with FIG. 3B, which illustrates regular applications that have no known timing channels. A representative benign application pair is shown from SPEC2006 benchmarks with relatively high LLC activity, namely lbm and gobmk. These application pairs do not usually show any repetitive pulses or negative correlation in their occupancy rates. The occupancy patterns are rarely correlated (e.g., no obvious swing pattern). As such, there are time periods when both applications have unaligned negative dips, or one application's LLC occupancy fluctuates while the other remains unchanged, or the two LLC occupancies almost change in the same direction.

Based on the discussion above, the following key observation is made: Timing channels in caches fundamentally rely on conflict misses (that influence the spy's timing) and create repetitive swing patterns in cache occupancy regardless of the specific timing channel protocols. By analyzing these correlated swing patterns, there is a potential to uncover the communication strength in such attacks. It should be noted that merely tracking cache misses on an adversary will not be sufficient, as an attacker may inflate cache misses (through issuing additional cache loads that create self-conflicts) on purpose to evade detection. In contrast, cache occupancy cannot be easily obfuscated by an attacker on its own. Manipulation of cache occupancy will require collusion with an external process (that may, in turn, reveal swing patterns in cache occupancies with the attacker) or through using a clflush instruction (that may be monitored easily). Addressing such approaches is discussed further below with respect to Section V.

II. System Design

Figure 4:
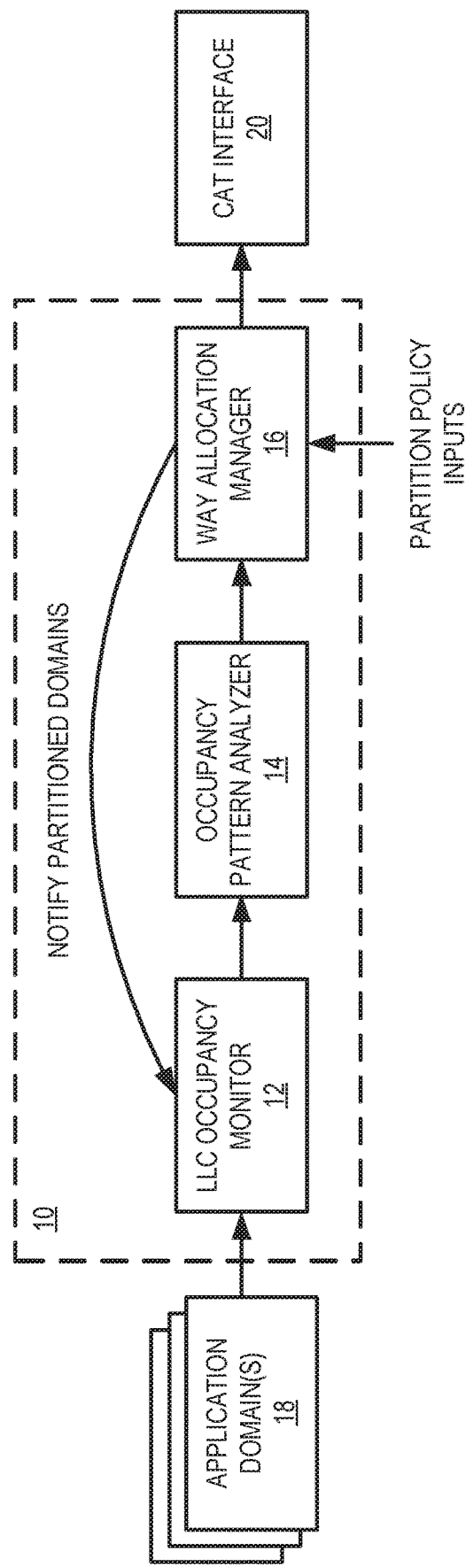
FIG. 4 is a schematic diagram of an exemplary embodiment of a system for defense against timing channel attacks, referred to herein as COTSknight.

FIG. 4 is a schematic diagram of an exemplary embodiment of a system for defense against timing channel attacks, referred to herein as COTSknight 10. COTSknight 10 comprises three main components: an LLC occupancy monitor 12 (e.g., cache occupancy monitor), an occupancy pattern analyzer 14, and a way allocation manager 16. The LLC occupancy monitor 12 creates LLC occupancy data, which can include traces of LLC occupancy patterns among mutually distrusting application domains 18. The occupancy pattern analyzer 14 identifies suspicious pairs of the application domains 18 that are very likely to be involved in timing channel-based communication. The way allocation manager 16 dynamically partitions cache ways among suspicious application domains 18 (e.g., using a CAT interface 20) to prevent information leakage through the cache (e.g., LLC).

Figures 5A, 5B:
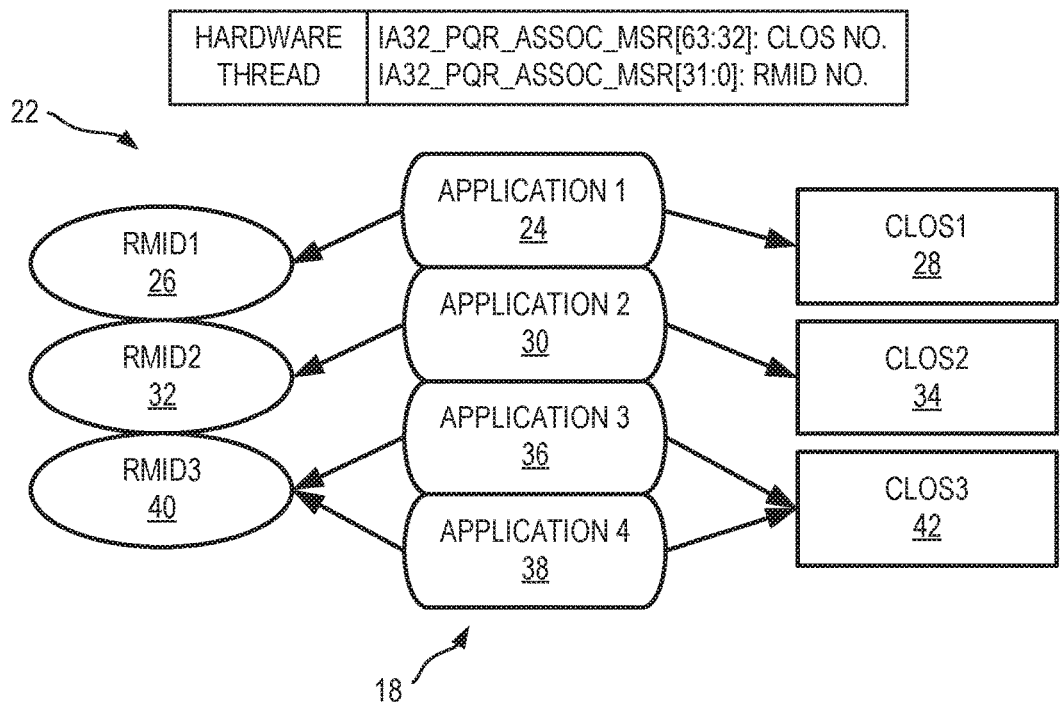
FIG. 5A is a block schematic diagram of application domains to resource monitoring identification (RMID) and class of service (CLOS) mapping in an exemplary processor.
FIG. 5B illustrates an exemplary configuration of CLOSs in the exemplary processor of FIG. 5A.

Embodiments of COTSknight 10 make use of processor hardware, such as illustrated in FIGS. 5A and 5B, to assist in monitoring cache occupancy and to provide secure cache management to thwart cache timing channels. This section further discusses cache occupancy monitoring with reference to FIGS. 6A and 6B. Occupancy trace analysis is further discussed with reference to FIGS. 7A-7D. The way allocation mechanism is then discussed, which dynamically partitions the cache to prevent potential information leakage.

COTSknight 10 is discussed herein with particular reference to implementation on an LLC of a processor. This is due to the shared nature of the LLC in multi-core processors, as well as the larger area of attack such that the LLC is a more likely target of timing channel attacks. It should be understood that other embodiments may implement COTSknight 10 on other cache levels (e.g., L1 cache, L2 cache, L3 cache, etc.) per design and security needs.

A. Processor Hardware

Cache monitoring resources (e.g., Intel's CMT) in a processor allow for uniquely identifying each logical core (e.g., hardware thread) with a specific resource monitoring identification (RMID). Each unique RMID can be used to track the corresponding LLC usage by periodically reading from a corresponding register (e.g., model specific register (MSR)). It is possible for multiple application threads to share the same RMID, allowing for their LLC usage to be tracked together. Such a capability enables flexible monitoring at user-desired domain granularity such as a core, a multi-threaded application, or a virtual machine.

Additionally, cache way allocation (e.g., Intel's CAT) enables an agile way for partitioning the LLC ways in a processor. With cache way allocation, the LLC can be configured to have several different partitions on cache ways, called class(es) of service (CLOS). A hardware context that is restricted to certain ways can still read the data from other ways where the data resides; however, it can only allocate new cache lines in its designated ways. Accordingly, evicting cache lines from another CLOS is not possible. The default for all applications is CLOS0, where all cache ways are accessible.

FIG. 5A is a block schematic diagram of application domains 18 to RMID and CLOS mapping in an exemplary processor 22. In this example, a first application 24 is mapped to a first RMID 26 and a first CLOS 28. A second application 30 is mapped to a second RMID 32 and a second CLOS 34 (e.g., separate from the first CLOS 28). A third application 36 and a fourth application 38 are mapped to a shared third RMID 40 and a shared third CLOS 42 (e.g., separate from the first CLOS 28 and the second CLOS 34). In this manner, the third application 36 and the fourth application 38 may not be mutually suspicious, while the first application 24 and the second application 30 can be monitored separately.

FIG. 5B illustrates an exemplary configuration of CLOS in the exemplary processor 22 of FIG. 5A. As shown in FIG. 5B, IA32_L3_MASK_n_MSRs are set to configure the specific ways to a certain CLOS partition. By writing to the per-logical core IA32_PQR_ASSOC_MSR, each application can be associated with a certain RMID and CLOS. Note that both the cache monitoring resources (e.g., CMT) and the cache way allocation (e.g., CAT) can be reconfigured at runtime without affecting the existing application domains 18. Also, not all pairs of application domains 18 need to monitored, and can be limited to mutually distrusting or suspicious ones.

B. LLC Occupancy Monitor

With continuing reference to FIGS. 4 and 5A, from the architecture perspective, the finest granularity for the LLC occupancy monitor 12 is at the level of logical cores that can be readily setup with the cache monitoring resources of the processor 22 (e.g., CMT or another built-in cache monitoring infrastructure of the processor 22 normally used for observing performance and/or improving application runtime). However, this requires every thread migration between cores to be manually bookmarked. To counter this problem, application-level and virtual machine (VM) level monitoring are available, that can automatically manage remapping of RMIDs (e.g., 26, 32, 40) when applications or VM guests swap in or out of logical cores. Also, in some examples, the cache monitoring resources of the processor 22 integrate a query-based model where any core in a processor package can query the LLC occupancy of other cores. Certain embodiments of COTSknight 10 capitalize this capability and use a separate, non-intrusive thread to collect LLC occupancy traces for all of the currently running application domains 18.

FIG. 6A is a graphical representation of an exemplary LLC occupancy trace for a trojan and spy pair in a covert channel with a serial protocol and on-off encoding. FIG. 6B is a graphical representation of an exemplary LLC occupancy trace for a victim and spy pair in a side channel with a parallel protocol and pulse-position encoding. The LLC occupancy monitor 12 produces occupancy data, which can include the occupancy traces illustrated in FIGS. 6A and 6B, for analysis by the occupancy pattern analyzer 14.

C. Occupancy Pattern Analyzer

With continuing reference to FIGS. 4, 6A, and 6B, once LLC traces are gathered, the occupancy pattern analyzer 14 checks for any potential timing channel activity. Note that the timing channel attacks can happen within a certain period during the span of entire program execution. Accordingly, embodiments of the occupancy pattern analyzer 14 adopt a window-based analysis of LLC occupancy traces. The window size can be chosen by a system administrator based on needs (e.g., swiftness of defense vs. runtime overhead trade-offs).

FIGS. 7A-7D illustrate exemplary results of LLC trace analysis by the occupancy pattern analyzer 14. In this regard, it can be assumed that there are n windows (indexed by i) of raw LLC occupancy traces for a pair of application domains 18 ($D_1$, $D_2$). $x_i$ and $y_i$ ($0 \le i \le n-1$) are the LLC occupancy sample vectors obtained by reading LLC occupancy MSRs periodically within the $i^{th}$ window for application domains 18 $D_1$ and $D_2$, respectively (assuming that there are p+1 samples within each window). The time-differentiated cache occupancy traces are computed to extract the information on LLC occupancy changes:

$$\Delta x_{i,j} = x_{i,j+1} - x_{i,j}$$

$$\Delta y_{i,j} = y_{i,j+1} - y_{i,j} \quad \text{Equation 1}$$

where $x_{i,j}$ and $y_{i,j}$ are the $j^{th}$ MSR samples ($0 \le j \le p-1$) in the $i^{th}$ window for application domains 18 $D_1$ and $D_2$. Exemplary time-differentiated LLC occupancy traces for covert and side channels are illustrated in FIGS. 6A and 6B, as discussed further above.

As the second step, the occupancy pattern analyzer 14 focuses on finding mirror images of pulses in the two time-differentiated cache occupancy traces. As discussed above with respect to FIGS. 1A-1D and 2A-2D, the spy and trojan communicate by growing their own cache space through taking away the corresponding cache space from each other to create conflict misses that alter cache access timing for the spy. To filter the noise effects from surrounding cache activity, embodiments of the occupancy pattern analyzer 14 takes the product ($z_i$) of $\Delta x_{i,j}$ and $\Delta y_{i,j}$ and zeroes out all non-negative values that do not correspond to gain-loss swing patterns in LLC occupancy:

$$z_{i,j} = \begin{cases} \Delta x_{i,j} \cdot \Delta y_{i,j}, & \Delta x_{i,j} \cdot \Delta y_{i,j} < 0 \\ 0, & \Delta x_{i,j} \cdot \Delta y_{i,j} \ge 0 \end{cases} \quad \text{Equation 2}$$

The above equation elegantly captures the swing pattern and cancels noise from other background processes. When cache occupancy of one process changes while the other one remains stationary, the product at that point would be zero. When two processes are both influenced by a third-party process, their cache occupancy might change in the same direction, so that the product of two time-differentiated occupancy trace points would be positive. Negative values occur when the cache occupancy patterns of the two processes move in opposite directions due to mutual cache conflicts.

In effect, the series $z_i$ contains information about mutual eviction behavior between the two processes. The occupancy pattern analyzer 14 can then check if the z series contains repeating patterns that may be caused by intentional eviction over a longer period of time (denoting illegal communication activity). For every window, the occupancy pattern analyzer 14 computes autocorrelation function $r_i$ for $z_i$:

$$r_i(m) = \begin{cases} \sum_{j=0}^{p-m-1} z_{i,j} \cdot z_{i,j+m}, & m \ge 0 \\ r_i(-m), & m < 0 \end{cases} \quad \text{Equation 3}$$

where m (samples) is the lag of series $z_i$ and $m \in [-p+1, p-1]$. The autocorrelation function is normalized to detect the linear relationship between $\Delta x_i$ and $\Delta y_i$. The normalized autocorrelation function $r_i'$ is defined as:

$$r_i'(m) = \frac{r_i(m)}{\sqrt{\left(\sum_{j=0}^{p-1} \Delta x_{i,j}^4\right) \cdot \left(\sum_{j=0}^{p-1} \Delta y_{i,j}^4\right)}} \quad \text{Equation 4}$$

According to the Cauchy-Schwarz Inequality, if the time-differentiated curves $\Delta x_i$ and $\Delta y_i$ are strictly linearly dependent, $r_i'(0)$ would be equal to 1. Conversely, the lack of linear dependency between $\Delta x$ and $\Delta y$ would be indicated by $r_i'(0)$ being close to 0.

Note that benign applications may also exhibit short swing patterns on LLC occupancy, but are highly unlikely to repeat them over a longer period. To cancel noise from such short swings, embodiments of the occupancy pattern analyzer 14 take an average of all autocorrelation functions $r_i$ over n windows. The mean autocorrelation function is defined as:

$$r'(m) = \frac{1}{n}\sum_{i=0}^{n-1} r'_i(m) \quad \text{Equation 5}$$

With increase in lag value (m), the eviction pattern would begin to mismatch more heavily. Consequently, normalized autocorrelation at lag m, $r_i'$ (m) would begin to decrease. When the lag m equals to length of the complete pattern (wavelength, $m_w$), some of the patterns would rematch and the r'($m_w$) would rise back to higher values. Note that there still might exist a small offset in the repetitive pattern, and this may cause r'($m_w$) to be not as high as r'(0). However, r'($m_w$) is extremely likely to be a local maximum in the presence of timing channel activity. As m increases further, the local maxima caused by rematched patterns would begin to appear repeatedly.

Figure 7A:
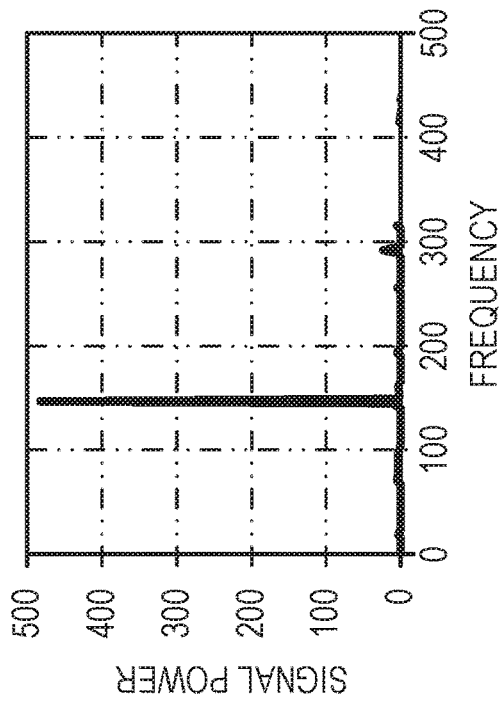
FIG. 7A is a graphical representation of a normalized autocorrelation function of the LLC occupancy trace for the trojan and spy pair of FIG. 6A.

FIG. 7A is a graphical representation of a normalized autocorrelation function of the LLC occupancy trace for the trojan and spy pair of FIG. 6A (e.g., a covert channel). In this example, r'(0) is very close to one, so the two time-differentiated LLC occupancies are linearly dependent.

Fourier transform is a powerful tool to extract the repetitive patterns in signals. Embodiments of the occupancy pattern analyzer 14 further compute discrete Fourier transform of the autocorrelation function r':

$$R(k) = \Sigma_{m=-p+1}^{p-1} r'(m) \cdot W_{2p-1}^{m \cdot k} \quad \text{Equation 6}$$

where $W_{2p-1} = e^{-2\pi i/(2p-1)}$ and i is the imaginary constant ($i^2 = -1$). Here R is the power spectrum of z. The presence of a single or equally-spaced multiple spikes with concentrated (very high) signal power outside of frequency 0 in R indicates a repetitive pattern in the underlying sequence. Note that this is a typical characteristic of timing channels.

Figure 7B:
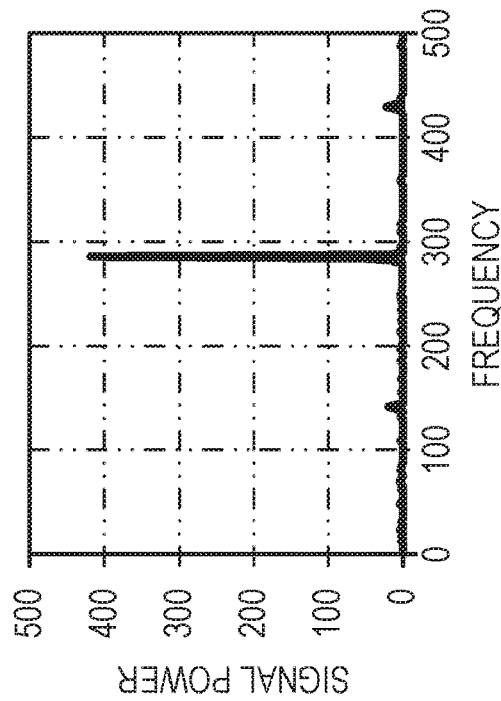
FIG. 7B is a graphical representation of a power spectrum of the LLC occupancy trace of FIG. 6A.

FIG. 7B is a graphical representation of a power spectrum of the LLC occupancy trace of FIG. 6A. Repeated occurrence of local maxima and a sharp peak around a frequency of 150 in the power spectrum can be visually observed, which indicates timing channel activity.

Figure 7C:
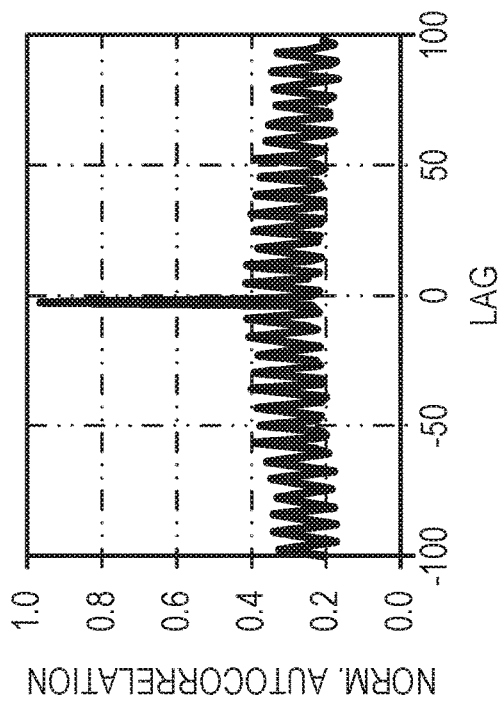
FIG. 7C is a graphical representation of a normalized autocorrelation function of the LLC occupancy trace for the victim and spy pair of FIG. 6B.
Figure 7D:
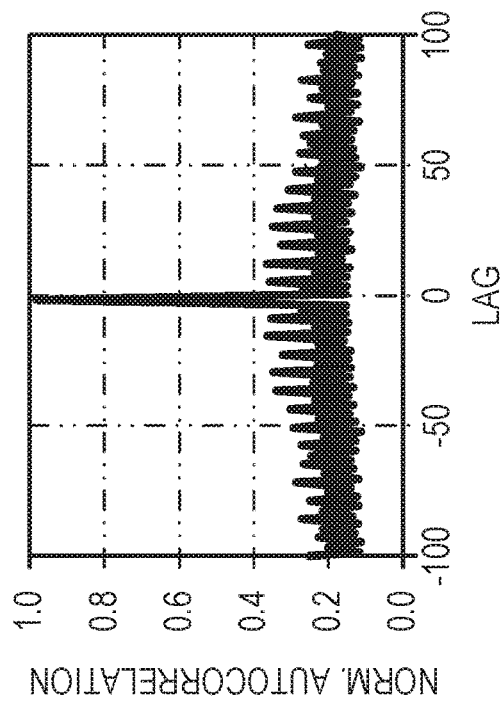
FIG. 7D is a graphical representation of a power spectrum of the LLC occupancy trace of FIG. 6B.

Similarly, FIG. 7C is a graphical representation of a normalized autocorrelation function of the LLC occupancy trace for the victim and spy pair of FIG. 6B (e.g., a side channel). FIG. 7D is a graphical representation of a power spectrum of the LLC occupancy trace of FIG. 6B. In this example, r'(0) is very close to one (as depicted in FIG. 7C), indicating linear dependency, and a sharp peak is observed in the power spectrum (as depicted in FIG. 7D) around a frequency of 290.

Using such analysis techniques, the occupancy pattern analyzer 14 identifies a potential timing attack involving a pair of processes (e.g., the victim and spy pair). The occupancy pattern analyzer 14 may further provide RMIDs for the pair of processes (e.g., application domains 18) involved in the potential timing attack for cache access segregation or another action to disband the timing channel.

In principle, using advanced communication protocols, it is possible for the trojan and spy to pseudo-randomize the intervals between two consecutive bits to obscure the periodicity in the channel. However, in practice, cache timing channels with randomized bit intervals are very hard to synchronize at these random times in a real system environment amidst noise stemming from hardware, OS and external processes. As such, these attacks can be subject to a severely reduced bit-rate and high transmission errors. No such cache attacks with pseudo-random intervals are reported in the literature. Even in such hypothetical cases, the repetitive swing pattern can be recovered with proper signal filtering (discussed further below with respect to Section V).

D. Way Allocation Manager

With continuing reference to FIG. 4, after the way allocation manager 16 receives RMIDs of identified suspicious application domains 18 from the occupancy pattern analyzer 14, it will configure LLC ways to fully or partially isolate the suspicious pairs. Note that all of the newly created application domains 18 (e.g., newly spawned processes) may be initially set to a default CLOS (e.g., CLOS0) with access to all LLC ways.

Consider a newly discovered suspicious pair ($D_1$, $D_2$). The way allocation manager 16 can simply create two non-overlapping CLOS (e.g., CLOS1 and CLOS2, which are separate and disjoint) for assignment to $D_1$ and $D_2$. In this manner, COTSknight 10 heuristically assigns ways to each application domain 18 (e.g., due to each CLOS having a predefined cache ways accessible to its corresponding application process(es)) based on their ratio of LLC occupancy sizes during the last observation period. To avoid starvation, in some examples a partition policy of the way allocation manager 16 sets a minimum number of ways for any application domain 18 (e.g., the minimum can be set to four, which works reasonably well as demonstrated in Section IV below).

The way allocation manager 16 can apply different allocation policies to manage the partitioned application domains 18 at runtime. Two exemplary allocation policies are discussed: 1) an aggressive policy that partitions the two suspicious application domains 18 and keeps them separated until one of them finishes execution. This policy guarantees the highest level of security, and removes the need to track already separated application domains 18. 2) A jail policy that partitions the two application domains 18 for a period of time, and then allows access to all of the LLC partitions upon timeout. This policy provides the flexibility to accommodate benign application pairs that need to be partitioned tentatively.

It should be understood that other embodiments of the way allocation manager 16 may implement other policies, such as a combination of the jail policy and the aggressive policy based on repetition of suspected timing channels and/or degree of certainty of timing channel activity. For long-running applications, restricting the cache ways over time may not be desirable, and the way allocation manager 16 may instead implement a policy for migrating suspected spy processes to other processors. This may be a better option, especially for victims in side channels.

III. Implementation

Figure 8:
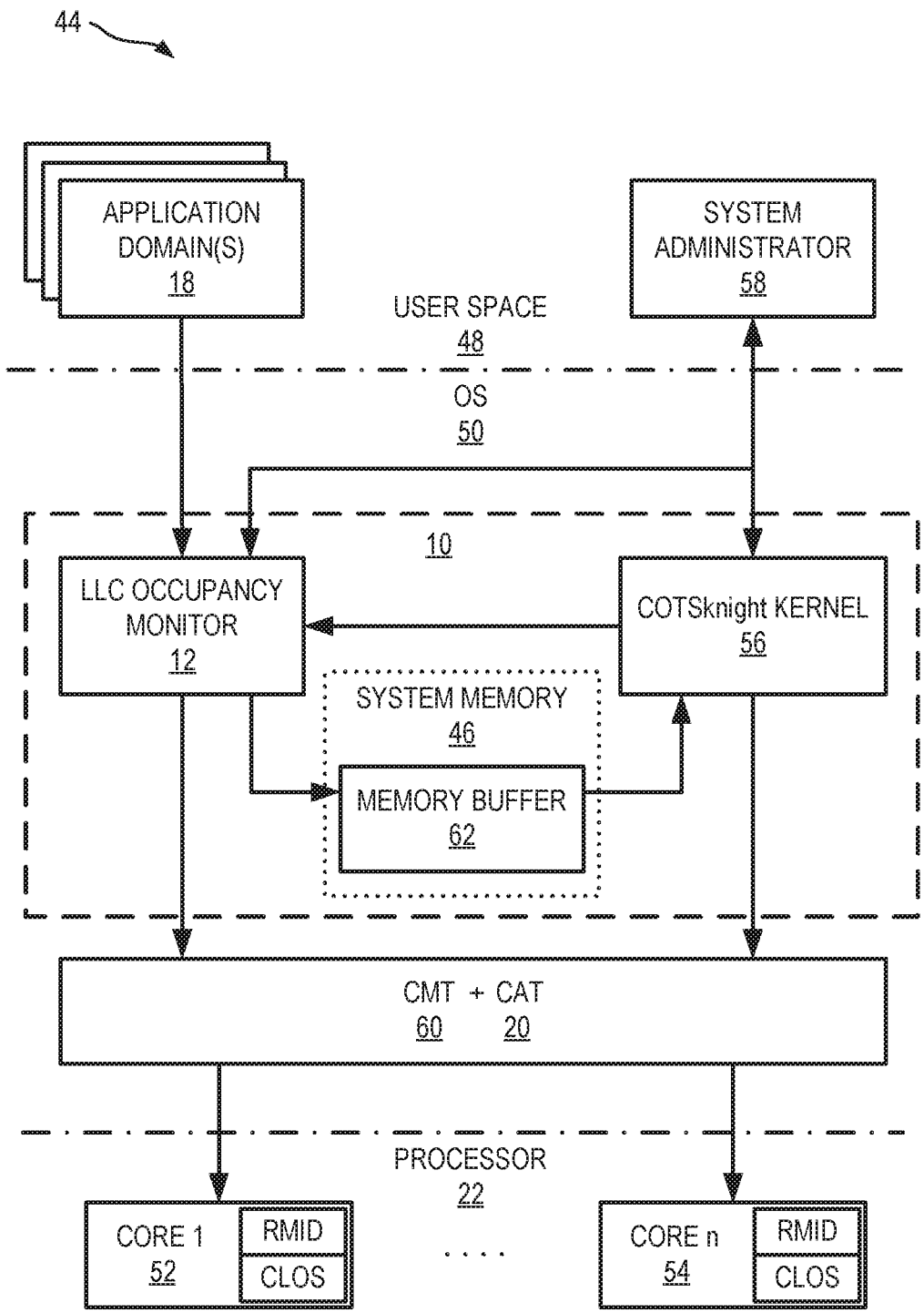
FIG. 8 is a schematic diagram of an exemplary implementation of COTSknight in a computer system.

FIG. 8 is a schematic diagram of an exemplary implementation of COTSknight 10 in a computer system 44. The computer system 44 comprises any computing or electronic device capable of including firmware, hardware, and/or executing software instructions that could be used to perform any of the methods or functions described above, such as identifying (and guarding against) a cache timing channel attack. In this regard, the computer system 44 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The computer system 44 in this embodiment includes a processing device or processor 22 and a system memory 46 which may be connected by a system bus (not shown). The system memory 46 may include non-volatile memory (e.g., read-only memory (ROM), erasable programmable ROM (EPROM), electrically erasable programmable ROM (EEPROM)) and volatile memory (e.g., random-access memory (RAM), dynamic RAM (DRAM), synchronous DRAM (SDRAM)).

The computer system 44 may be implemented with a user space 48 and an operating system 50, each of which may reside in the system memory 46 and interact with the processor 22. One or more application domains 18 reside in the user space 48 and represent a wide array of computer-executable instructions corresponding to programs, applications, functions, and the like, which are executed by the processor 22. However, the user space 48 interfaces with the operating system 50, and the operating system 50 interfaces with the processor 22, such that application domains 18 access the processor 22 via the operating system 50. Accordingly, in an exemplary aspect, some or all of the COTSknight 10 resides on the operating system 50 to facilitate monitoring, analyzing, and guarding against potential cache timing channel attacks.

The processor 22 represents one or more commercially available or proprietary general-purpose processing devices, such as a microprocessor, central processing unit (CPU), or the like. More particularly, the processor 22 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 22 is configured to execute processing logic instructions for performing the operations and steps discussed herein. In an exemplary aspect, the processor 22 includes two or more processor cores 52, 54 for executing instructions in parallel.

In this regard, the various illustrative logical blocks, modules, and circuits described in connection with the embodiments disclosed herein may be implemented or performed with the processor 22, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. The processor 22 may also be implemented as a combination of computing devices (e.g., a combination of a DSP and a microprocessor, a plurality of microprocessors, one or more microprocessors in conjunction with a DSP core, or any other such configuration).

In an exemplary implementation used for evaluating an embodiment of the COTSknight 10 (described further below in Section IV), the processor 22 is an Intel Xeon E5-2698 v4 processor. The operating system 50 is Centos 7.0 with Linux kernel 4.10.12. However, it should be understood that this is illustrative in nature, and in other embodiments the processor 22 may be any conventional or custom processor, controller, microcontroller, or state machine, and the operating system 50 may be any conventional or custom operating system.

As illustrated in FIG. 8, COTSknight 10 is deployed as an operating system 50 level service that has two major modules, the LLC occupancy monitor 12 and a COTSknight kernel 56. That is, the cache occupancy monitor can be deployed on a combination of firmware and management layers operating on a processor, such as the operating system 50.

LLC Occupancy Monitor 12.

The LLC occupancy monitor 12 dynamically traces the LLC occupancy for a watch-list of application domains 18. It designates newly created application domains 18 (e.g., VMs, applications) with RMIDs, and also performs recycling of RMIDs. By default, all running application domains 18 are monitored separately. The LLC occupancy monitor 12 can export interface to a system administrator 58 (e.g., resident in the user space 48) to override domain configurations. For instance, multiple application domains 18 belonging to the same user can be grouped together.

In an exemplary aspect, the LLC occupancy monitor 12 periodically queries the LLC occupancy MSRs in the processor 22 (e.g., via a CMT interface 60, which may include or be separate from the CAT interface 20) at a configurable sampling rate (setup by the system administrator 58). The cache occupancy data for all the monitored application domains 18 are stored in a memory buffer 62, which may be a first-in-first-out (FIFO) buffer resident on the system memory 46. When the memory buffer 62 is full (or has gathered sufficient cache occupancy data), the LLC occupancy monitor 12 notifies the COTSknight kernel 56 for signal analysis. In some examples, when the LLC occupancy monitor 12 receives notification from the COTSknight kernel 56 about partitioned application domains 18, the LLC occupancy monitor 12 can remove the partitioned application domains 18 (e.g., with access to disjoint cache sets) from its watch-list (e.g., temporarily or for the duration of application runtime, per COTSknight 10 policy). In other examples, the LLC occupancy monitor 12 can continue to monitor all application domains 18.

COTSknight Kernel 56.

The COTSknight kernel 56 module combines the occupancy pattern analyzer 14 and the way allocation manager 16. It periodically empties the memory buffer 62 by reading the LLC occupancy traces for the monitored application domains 18, and performs signal analysis based on the approach discussed above in Section II-C. Once newly suspicious application domains 18 are recognized, the COTSknight kernel 56 generates a domain to CLOS mapping so that these application domains 18 will be isolated and potential timing channels can be annulled. The COTSknight kernel 56 can flexibly manage the partitioned application domains 18 based on the partition policy inputs provided by the system administrator 58 (discussed above in Section II-D).

IV. Evaluation

An embodiment of the COTSknight 10 is evaluated using the implementation described above with respect to FIG. 8, wherein the processor 22 is an Intel Xeon V4 with 16 CLOS and 20 LLC slices, and each LLC slice has 20×2048 64-byte blocks. By default, all logical cores are assigned a RMID0 (the default RMID), and the associated CLOS configuration MSR is set to 0xFFFFF. This means that all application domains 18 can use all LLC ways initially.

COTSknight 10 initializes the memory buffer to accumulate LLC MSR readings sampled at 1,000 per second (maximum stable rate supported by the current hardware). The occupancy pattern analyzer 14 processes n consecutive windows of occupancy samples, where n is set to 5 and window size is equal to 500 ms.

Attack scenarios are evaluated along both time and space dimensions, as detailed in Table I. Each variant is configured to perform the prime+probe attack using a specific number of cache sets (32~128). For serial-onoff and para-onoff, all target cache sets are treated as one group, and for serial-pp and para-pp, two equally-sized groups of cache sets are generated.

TABLE I

Cache timing attack classes evaluated

| Abbreviation | Encoding | Timing |
| --- | --- | --- |
| para-onoff | On-off | Parallel |
| serial-onoff | On-off | Serial |
| para-pp | Pulse-position | Parallel |
| serial-pp | Pulse-position | Serial |

Each attack variant shown in Table I is set up to run for 90 seconds (s) on the Intel Xeon v4 server. To emulate real system environment, two SPEC2006 benchmarks are co-scheduled alongside the trojan and spy. Each attack variant is run multiple times with different co-scheduled process pairs and numbers of target sets. The occupancy pattern analyzer 14 performs pair-wise normalized autocorrelation on time-differentiated LLC occupancy traces for six combination pairs of application domains 18. In all cases, the trojan-spy pair consistently had the highest autocorrelation 0-lag (≥0.93), which is much higher than the other pairs of application domains 18 (<0.5).

Figure 9A:
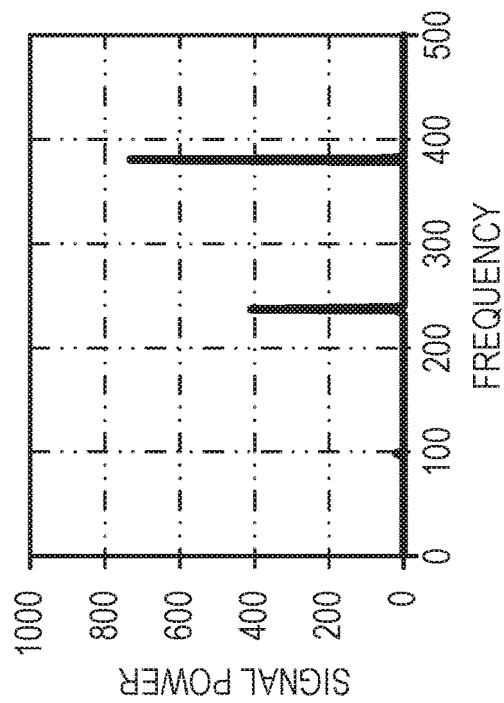
FIG. 9A is a graphical representation of a power spectrum of LLC occupancy data for a serial on-off (serial-onoft) timing channel attack variant.

FIGS. 9A-9D show results of the occupancy pattern analyzer 14 on representative windows for trojan-spy pairs. FIG. 9A is a graphical representation of a power spectrum of LLC occupancy data for a serial-onoff timing channel attack variant. In this example, a high normalized autocorrelation (0-lag) value of 0.93 is observed. An isolated, sharp peak in the corresponding frequency domain at 310 denotes concentrated power corresponding to transmission activity.

Figure 9B:
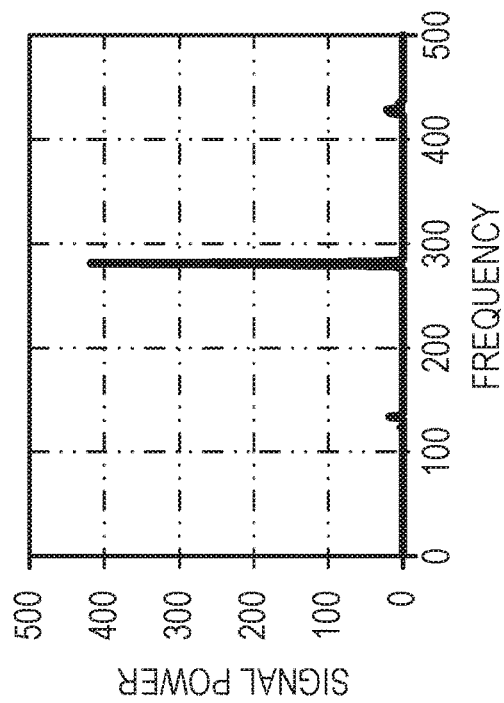
FIG. 9B is a graphical representation of a power spectrum of LLC occupancy data for a serial pulse-position (serial-pp) timing channel attack variant.
Figure 9C:
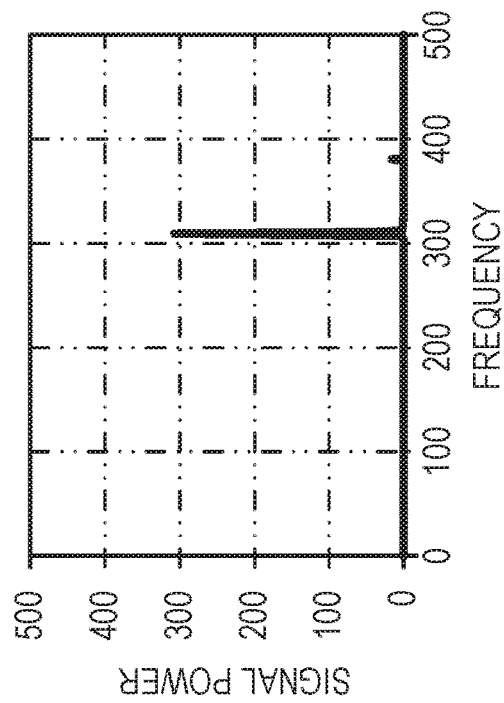
FIG. 9C is a graphical representation of a power spectrum of LLC occupancy data for a parallel on-off (para-onoff) timing channel attack variant.
Figure 9D:
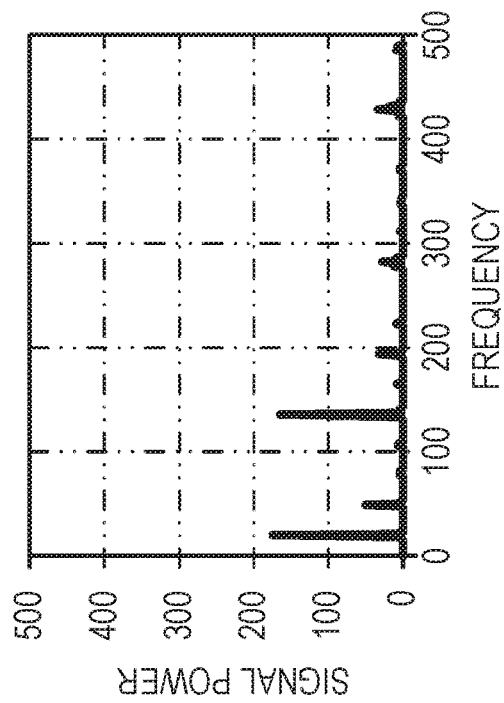
FIG. 9D is a graphical representation of a power spectrum of LLC occupancy data for a parallel pulse-position (para-pp) timing channel attack variant.

FIG. 9D is a graphical representation of a power spectrum of LLC occupancy data for a para-pp timing channel attack variant. A similar behavior is observed in this example, where the signal power is even higher due to a larger number of repetitive swing patterns in LLC occupancy between trojan-spy.

FIG. 9B is a graphical representation of a power spectrum of LLC occupancy data for a serial-pp timing channel attack variant. FIG. 9C is a graphical representation of a power spectrum of LLC occupancy data for a para-onoff timing channel attack variant. Interestingly, in the attack variants illustrated in FIGS. 9B and 9C, there exist two sharp peaks. This can be explained as follows: In some cache timing channels, there are usually two repetitive sets of behaviors at different frequency levels—1) prime+probe operations by the spy, and 2) cache accesses by the trojan.

For example, in serial-pp, the spy performs cache evictions during prime+probe periodically and the trojan activity can create variations in eviction patterns. This creates two different frequencies that are observed as two separate peaks in the power spectrum of FIG. 9B. Similarly, in para-onoff, for every trojan operation, the spy performs repeated multiple probes and during each probe, it causes repetitive cache set evictions. These two aspects are represented as periodic signals with two frequencies in the power spectrum of FIG. 9C.

In addition, the embodiment of COTSknight 10 is evaluated on benign workloads using two sets of benchmarks, namely SPEC2006 and CloudSuite (video streaming and memcached). Combinations of SPEC2006 benchmarks are run with reference inputs that exhibit various level of cache intensiveness. The two CloudSuite benchmarks are both cache-intensive workloads that are used for virtualized environments.

To generate benign workloads, SPEC2006 benchmarks are first classified into two groups: 1) H-Group, that has cache-sensitive applications with high rate of misses per kilo instructions (MPKI) and LLC accesses (including GemsFDTD, leslie3d, mcf, lbm, milc, soplex, bwaves, omnetpp, bzip2); and 2) L-Group, that contains the rest of the applications with relatively low cache-sensitivity. Workloads are generated with three levels of cache sensitivity from these two groups: (i) highly cache-intensive workloads (hh-wd) where all four applications are assembled from within H-Group; (ii) medium cache-intensive workloads (hl-wd) with two applications randomly selected from H-Group and the other two from L-Group; (iii) low cache-intensive workloads (ll-wd) where all four applications are chosen from L-Group.

FIGS. 10A-10D illustrate results of the occupancy pattern analyzer 14 on representative windows for benign workloads. Sixty benign multi-program workloads are run (20 in each sensitivity level) where each application is an individual application domain 18. The results show that a vast majority of domain pairs (79%) in benign workloads have very low normalized autocorrelation (0-lag) for the time-differentiated LLC occupancy traces.

Figure 10A:
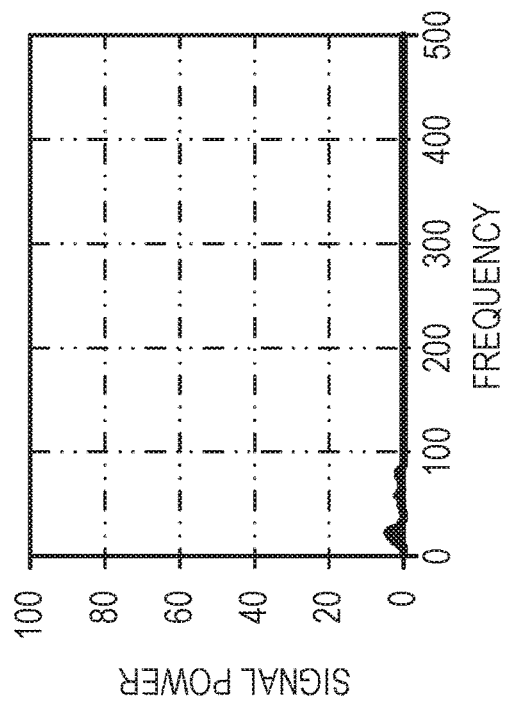
FIG. 10A is a graphical representation of a power spectrum of LLC occupancy data for a benign low cache-intensive workload (ll-wd).
Figure 10B:
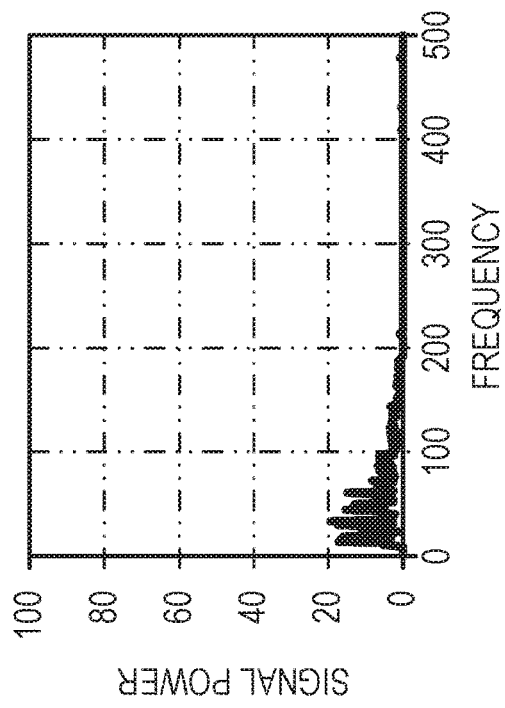
FIG. 10B is a graphical representation of a power spectrum of LLC occupancy data for a benign medium cache-intensive workload (hl-wd).
Figure 10C:
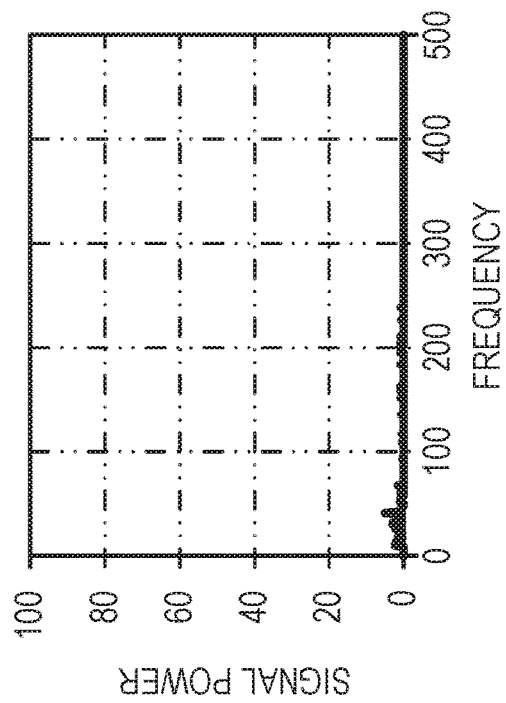
FIG. 10C is a graphical representation of a power spectrum of LLC occupancy data for a benign highly cache-intensive workload (hh-wd).

FIG. 10A is a graphical representation of a power spectrum of LLC occupancy data for a benign ll-wd workload (cal, hmm, gob, lib). FIG. 10B is a graphical representation of a power spectrum of LLC occupancy data for a benign hl-wd workload (Gem, hmm, xal, bwa). FIG. 10C is a graphical representation of a power spectrum of LLC occupancy data for a benign hh-wd workload (lbm, mil, sop, Gem). The power spectrums in these examples show no observable peaks.

Figure 10D:
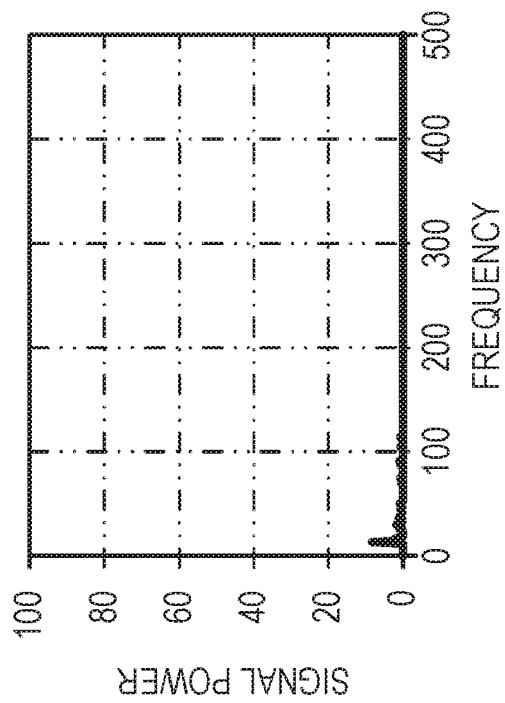
FIG. 10D is a graphical representation of a power spectrum of LLC occupancy data for another benign hh-wd workload.

FIG. 10D is a graphical representation of a power spectrum of LLC occupancy data for another benign hh-wd workload (Gem, mcf, bzi, bwa). This example shows an interesting hh-wd workload where there is a high normalized autocorrelation (0-lag) and a number of small peaks in the frequency domain, (corresponding to GemsFDTD and mcf). However, note that the peaks are simply numerous (unlike timing channels) and their relative signal strengths are weak (<20). It was found that the high autocorrelation (0-lag) results from a series of swing pulses due to cache interference between GemsFDTD and mcf, and the cache timing modulation is simply too chaotic (at many different frequencies) for any real communication to take place.

Figure 11:
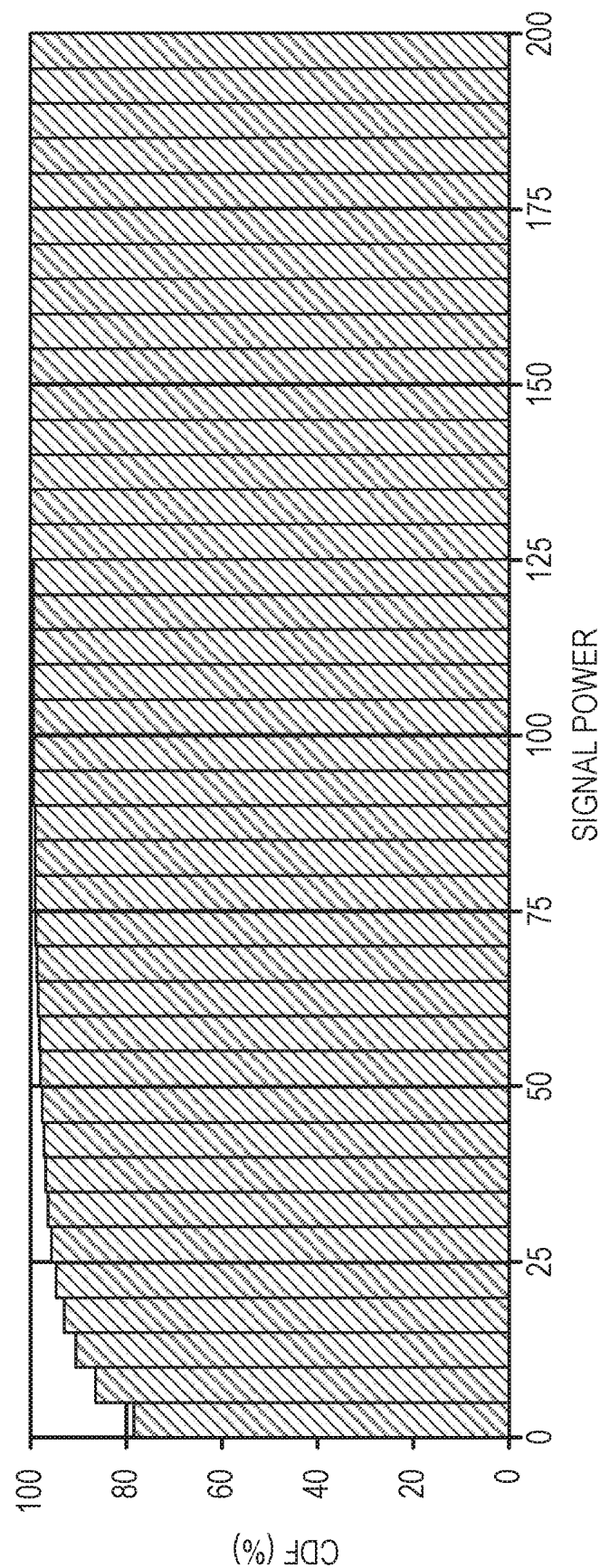
FIG. 11 is a graphical representation of a cumulative distribution function of peak signal power among benign workloads.

FIG. 11 is a graphical representation of a cumulative distribution function of peak signal power among benign workloads. The cumulative distribution function (CDF) is shown in thousands of analysis window samples (2.5 s) during execution of workloads. The peak signal power is observed to be less than 5 about 80% of the time, and higher than 50 for only about 2% of the time. This shows that a vast majority of benign workload samples do not exhibit high signal power, and are significantly less than any known timing channels (which usually have signal strength at well above 100).

Effectiveness of the embodiment of COTSknight 10 is evaluated on two aspects: 1) ability to counter cache timing channels, and 2) partition trigger rate and performance impact on benign workloads. To minimize performance impact on the victim in side channels, it is noted that migrating the spy to a different server may be also considered as an alternative mitigation strategy.

Defeating LLC Timing Channels.

Multiple instances of cache timing channel attack variants were run with different background processes, as well as with varying numbers of target cache sets. It is observed that the power peaks are well above 100 a vast majority of time in all timing channels. There are a few windows during the attack setup phase where the peak values drop slightly below 100. To avoid any false negatives on real attacks, a very conservative signal power threshold of 50 was chosen to trigger LLC partitioning. Evaluation results show that COTSknight 10 identifies all of the trojan-spy domain pairs within five consecutive analysis windows (500 ms each) after they start execution. Under stronger security constraints, the analysis window sizes can be set to lower values.

Partition Trigger Rate and Performance Impact for Benign Workloads.

On benign workloads in ll-wd category, LLC partitioning was never triggered during their entire execution. Among all workloads with low to high cache intensiveness, only 6% of the domain pair population had LLC partitioning—these benchmarks covered 2% of the analysis window samples.

Figure 12A:
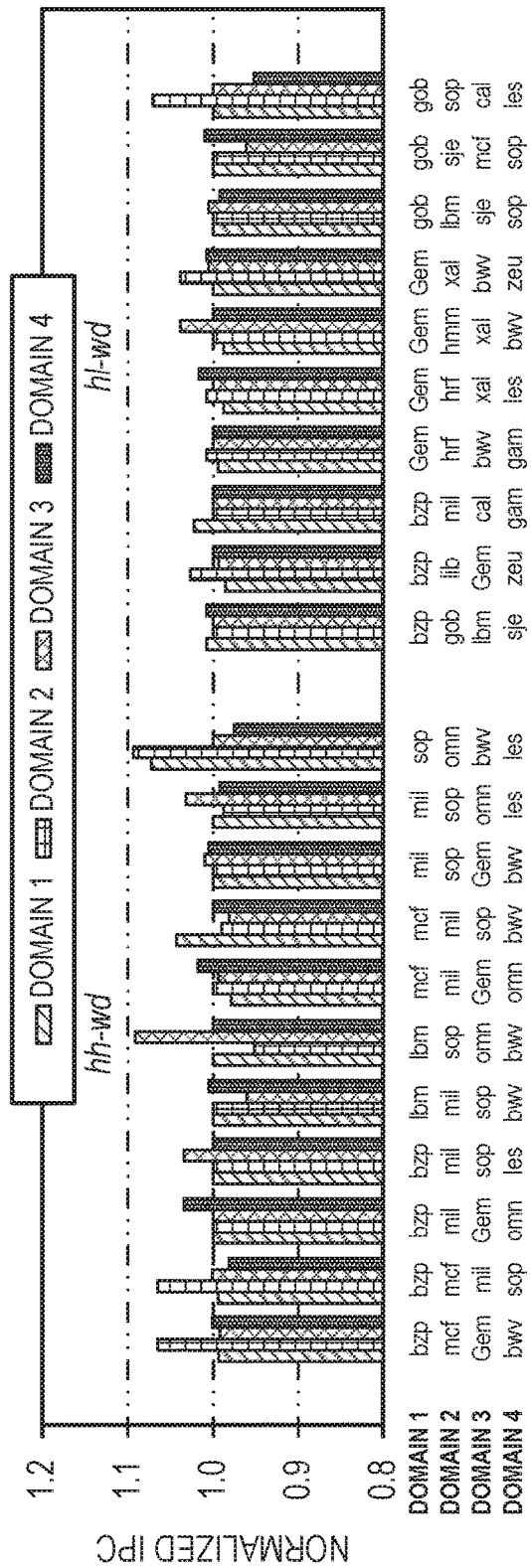
FIG. 12A is a graphical representation of performance impact on benign workloads where COTSknight triggers an LLC partition under an aggressive policy.
Figure 12B:
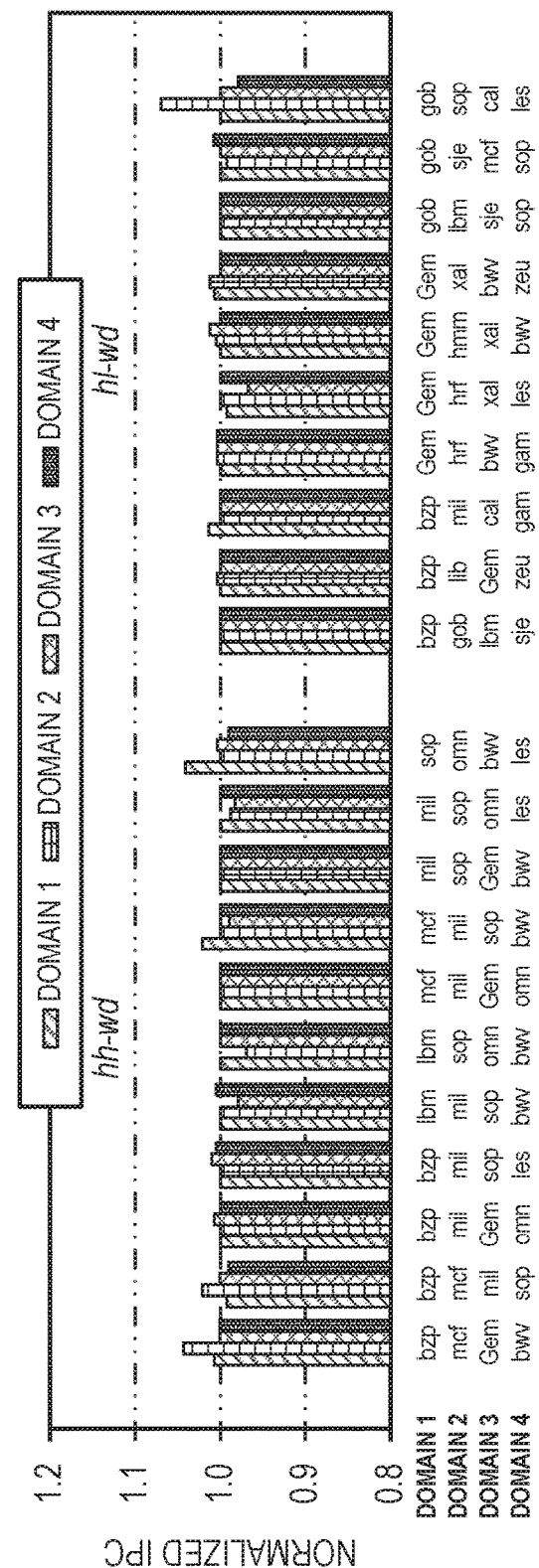
FIG. 12B is a graphical representation of performance impact on benign workloads where COTSknight triggers an LLC partition under a jail policy.

FIG. 12A is a graphical representation of performance impact on benign workloads where COTSknight 10 triggers an LLC partition under an aggressive policy. FIG. 12B is a graphical representation of performance impact on benign workloads where COTSknight 10 triggers an LLC partition under a jail policy. Performance impact is represented as normalized instructions per cycle (IPC) for the workloads that were partitioned at runtime. LLC partitioning minimally impacts most of the applications (less than 5% slowdown), and interestingly, a performance boost is observed for many of them (up to 9.2% performance speedup). The overall impact on all the applications that ran with partitioned LLC was positive (about 0.4% speedup). This is because even benign applications can suffer from significant cache contention and LLC partitioning can be beneficial (e.g., soplex and omnetpp). The results show that the aggressive policy of FIG. 12A (that fully partitions suspicious pairs) shows higher variations in both performance gains and losses, while the jail policy of FIG. 12B (that partitions tentatively for 30 s until timeout) incurs lesser performance penalties (as well as lesser performance gains).

Runtime Overhead.

COTSknight 10 implements the non-intrusive LLC occupancy monitoring for only mutually distrusting application domains 18 identified by the system administrator 58. The time lag to perform the autocorrelation and power spectrum analysis for the domain pairs is 25 ms, which means that COTSknight 10 offers rapid response to cache timing channel attacks. Overall, COTSknight 10 incurs less than 4% CPU utilization with 4 active mutually-distrusting application domains 18. Note that the runtime overhead of COTSknight 10 does not necessarily scale quadratically with the number of application domains 18 in the system since not all domains would have active LLC traces in each analysis window and only mutually-distrusting domain pairs would need to be analyzed.

Figure 13:
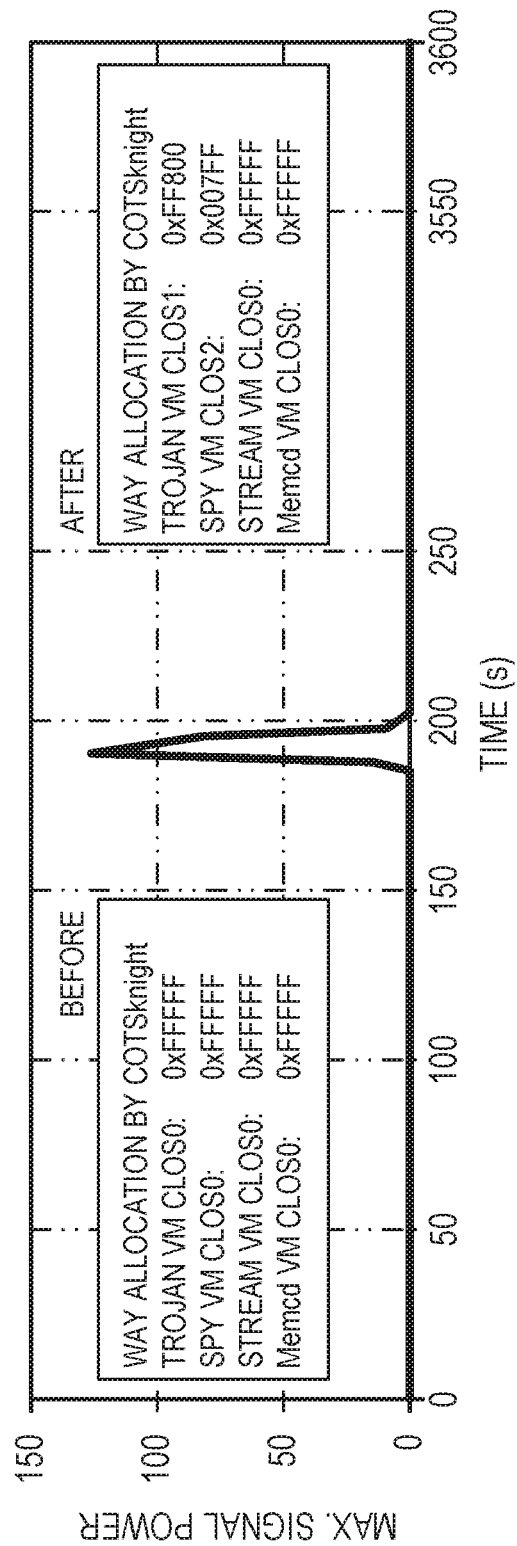
FIG. 13 is a graphical representation of peak signal power for one hour of system operation, illustrating launch of an attack followed by COTSknight mitigation through way allocation.

FIG. 13 is a graphical representation of peak signal power for one hour of system operation, illustrating launch of an attack followed by COTSknight 10 mitigation through way allocation. This example implements a para-onoff attack that works cross-VM. For this, four KVM VMs were set up where the trojan and spy run on two of the VMs, and simultaneously, two other VMs co-run representative cloud benchmarks, namely video streaming (stream) and memcached (memcd) from CloudSuite, both of which are highly cache-intensive. Each VM instance runs Ubuntu-14.04 with 4 logical cores and 2 GB DRAM. A single RMID is assigned to each VM instance that runs for an hour. The trojan/spy pair is set to start the para-onoff attack at a random time between 0 and 300 s.

In this example, COTSknight 10 is configured to use the aggressive policy to demonstrate the effectiveness of LLC partitioning. As illustrated in FIG. 13, the trojan and spy start to build communication at around 188 s (when increasing signal power is observed). The peak signal power between the trojan and spy domain pair quickly climbs up to 126 at time 192.5 s, which indicates a strong presence of timing channel activity in the current analysis window. This quickly triggers the way allocation manager 16 of COTSknight 10, which splits the LLC ways between trojan and spy VMs. Consequently, the maximum signal power drops back to nearly zero for the rest of execution, effectively preventing any further timing channels. Note that during the one hour experiment, the peak signal power values for the other domain pairs (involving CloudSuite applications) remained flat at values <3.

V. Sophisticated Adversaries

COTSknight 10 offers a new framework that builds on COTS hardware and uses powerful signal filtering techniques to eliminate noise, randomness or distortion to unveil timing channel activity. Filtering non-negatively correlated patterns and window-based averaging techniques to eliminate short swings were discussed above. This section discusses additional monitoring support and signal processing to detect sophisticated adversaries.

A. Transmission at Random Intervals

Figure 14A:
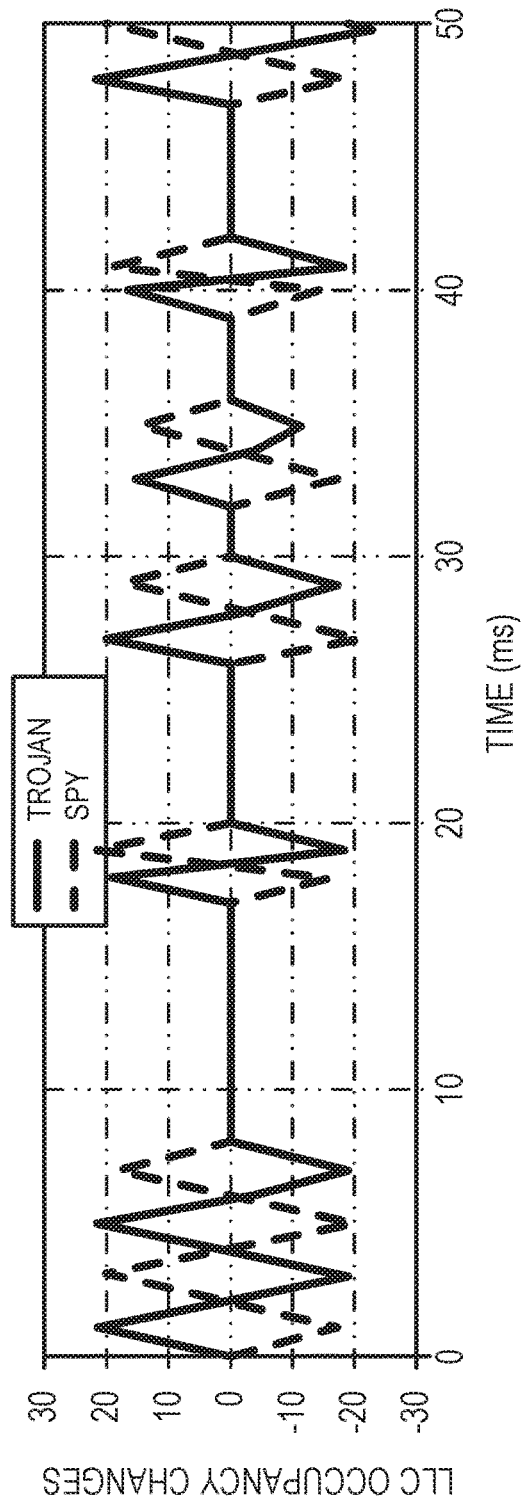
FIG. 14A is a graphical representation of an exemplary LLC occupancy trace for timing channel with transmission at random intervals.
Figure 14B:
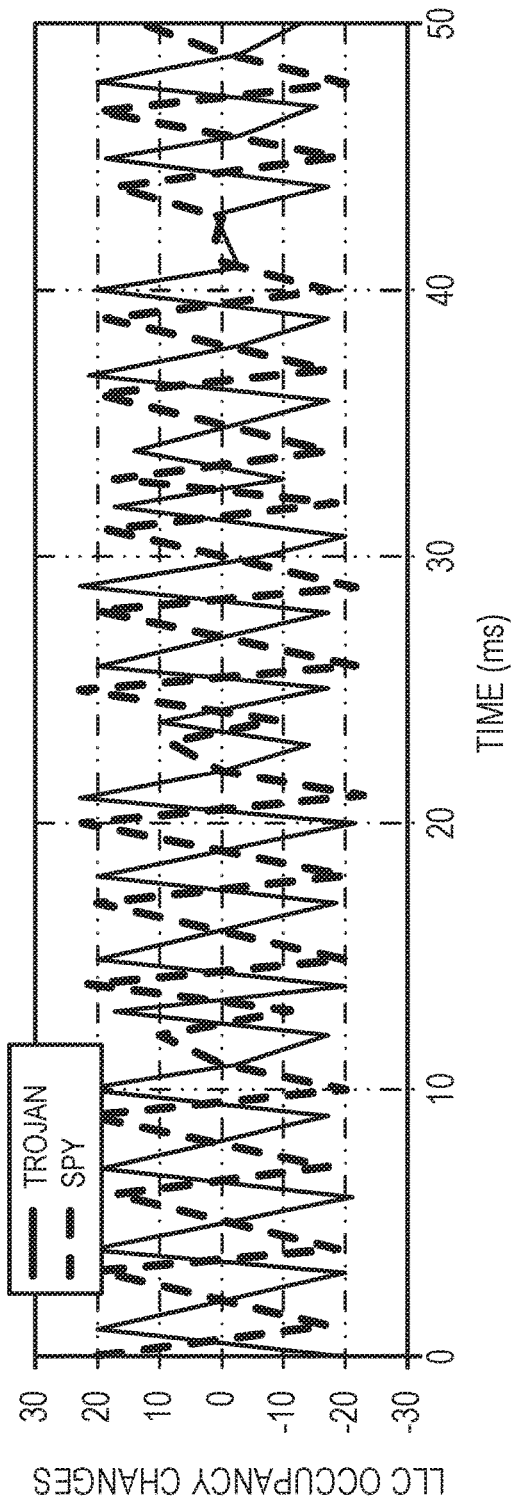
FIG. 14B is a graphical representation of the LLC occupancy trace of FIG. 14A after time-warping.
Figure 15:
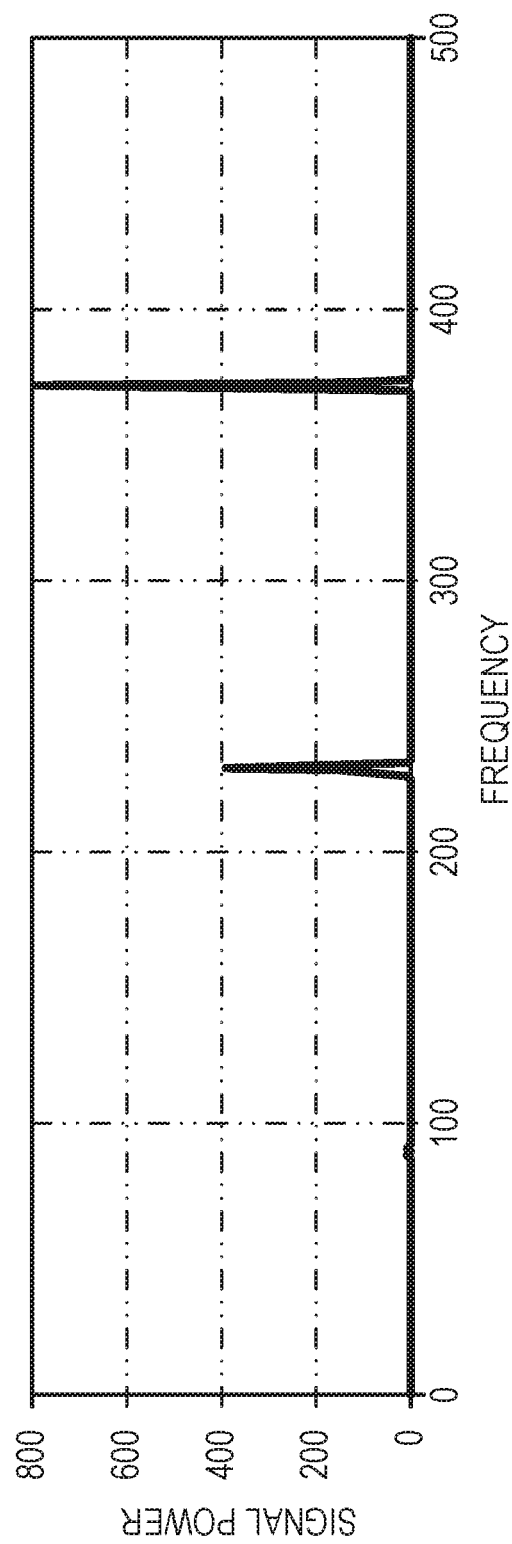
FIG. 15 is a graphical representation of a power spectrum of the LLC occupancy trace of FIG. 14B.

In theory, sophisticated adversaries may use randomized interval times between bit transmissions. For example, a trojan and spy can be imagined which set up a pre-determined pseudo-random number generator to decide the next waiting period before bit transmission. It should be noted that there does not exist any such demonstrated cache attack in the literature, and such an attack would be hard to synchronize under real system settings. Nevertheless, even if such attacks were feasible, COTSknight 10 can be adapted to recognize the attack through a signal pre-processing procedure called time warping that removes irrelevant segments from the occupancy traces (for which $\Delta x$, $\Delta y$ are 0 in Equation 1) and aligns the swing patterns. After this step, the periodic patterns are reconstructed, and the cadence of cache accesses from adversaries can be recovered. FIGS. 14A, 14B, and 15 demonstrate detection of this attack scenario by COTSknight 10.

FIG. 14A is a graphical representation of an exemplary LLC occupancy trace for timing channel with transmission at random intervals. For illustration, this futuristic attack is implemented by setting up the trojan and spy as two threads within the same process, with the main thread configured to control the synchronization. As shown in FIG. 14A, the LLC occupancy trace for this attack has random distances between the swing pulses.

FIG. 14B is a graphical representation of the LLC occupancy trace of FIG. 14A after time-warping. FIG. 15 is a graphical representation of a power spectrum of the LLC occupancy trace of FIG. 14B. With time warping, high signal power peaks are observed. Additionally, when this signal compression pre-processing step is applied on benign workloads, no increase in partition trigger rate is observed. It should be noted that other heuristic-based filtering, such as rate of swing patterns per second, may also be used to reduce false triggering on benign applications (if needed).

B. Other Potential Evasion Scenarios and Counter-Measures

Attackers may also attempt to distort swing patterns in other ways. While these are hypothetical cases (often difficult to implement practically), they are discussed here to emphasize the robustness of COTSknight 10 even under extreme cases.

Using clflush to Deflate LLC Occupancy.

An adversary may try to compensate the increase in its own cache occupancy by issuing a clflush instruction. To handle such scenarios, clflush commands by suspicious application domains 18 may be tracked and the associated memory sizes can be accounted back to the issuing core, thus restoring original occupancy data for analysis.

Using External Processes to Deflate LLC Occupancy.

A spy may deflate its LLC occupancy changes by involving another helper process. Note that the suspect swing patterns in LLC occupancy will essentially reflect in a trojan-helper pair instead of a trojan-spy pair. When COTSknight 10 isolates the helper, the trojan-spy pair will begin to show swing patterns in LLC occupancy.

Self-Deflation of LLC Occupancy.

Theoretically, another way to distort swings in LLC occupancy is to have the trojan and spy have shadow cache sets and perform the opposite operations to the ones performed on the transmission cache sets. However, completely eliminating the swing patterns requires the strong assumption that the spy (being the receiver) will know the change of occupancy patterns ahead of actual communication, which obviates the need for communication in the first place. On the other hand, if the trojan and spy fail to perform the perfect compensation, they will actually create a superposition of two swing patterns, which will also be a swing patterns. Note that, for side channels, it is impossible for the spy to enact this evasion method with a non-colluding victim.

Creating Irregular Swing Patterns.

The trojan/spy pair may hypothetically create irregular swings by working with an arbitrary number of cache sets at irregular intervals (hardest to be a practical attack). To handle such cases, signal quantization techniques abstract out the specific shape of the swing pulse through rounding and truncation may be used. After this step, the repetitive swing patterns will be recovered.

Those skilled in the art will recognize improvements and modifications to the preferred embodiments of the present disclosure. All such improvements and modifications are considered within the scope of the concepts disclosed herein and the claims that follow.

What is claimed is:

1. A method for identifying a cache timing channel attack based on cache occupancy, the method comprising:
   monitoring cache occupancy for a set of application processes operating in a processor to produce cache occupancy data over a period of time, comprising, during each of a plurality of time windows, reading cache occupancy for each of a plurality of application domains;
   performing a pair-wise analysis of the plurality of application domains based on the cache occupancy data, wherein the pair-wise analysis identifies autocorrelations of cache occupancy between pairs of application domains in respective time windows; and
   analyzing the pair-wise analysis and the cache occupancy data to identify a potential cache timing channel attack based on observing patterns of cache occupancy mirrored between application domains of one or more application domain pairs of the plurality of application domains over the plurality of time windows, wherein the potential cache timing channel attack is associated with a highest autocorrelation of the autocorrelations of cache occupancy of the pairs of application domains in respective time windows.

2. The method of claim 1, further comprising:
   partitioning cache access between a pair of application processes involved in the potential cache timing channel attack.

3. The method of claim 2, wherein:
   partitioning the cache access between the pair of application processes involved in the potential cache timing channel attack comprises assigning at least one of the pair of application processes to a separate class of service (CLOS); and
   each CLOS has a predefined cache ways accessible to a corresponding application process.

4. The method of claim 2, wherein partitioning the cache access between the pair of application processes involved in the potential cache timing channel attack comprises partitioning the cache access temporarily.

5. The method of claim 2, wherein partitioning the cache access between the pair of application processes involved in the potential cache timing channel attack comprises partitioning the cache access until at least one of the pair of application processes finishes execution.

6. The method of claim 1, wherein monitoring the cache occupancy comprises using a cache occupancy monitor provided by the processor.

7. The method of claim 6, wherein the cache occupancy monitor provided by the processor is a built-in cache monitoring infrastructure of the processor for at least one of observing performance or improving application runtime.

8. The method of claim 1, wherein the method is performed on an operating system in communication with the processor.

9. A method for identifying a cache timing channel attack, the method comprising:
   receiving cache occupancy data for a set of application domains occupying a cache in a processor;
   performing a pair-wise analysis of the set of application domains over a plurality of time windows based on the cache occupancy data, wherein the pair-wise analysis identifies autocorrelations of cache occupancy between pairs of application domains in respective time windows; and
   identifying a potential cache timing channel attack from the pair-wise analysis in response to observing patterns of cache occupancy mirrored between application domains of one or more application domain pairs of the plurality of application domains over the plurality of time windows, wherein the potential cache timing channel attack is associated with a highest autocorrelation of the autocorrelations of cache occupancy of the pairs of application domains in respective time windows.

10. The method of claim 9, wherein a window size of the plurality of time windows is user controllable.

11. The method of claim 9, wherein performing the pair-wise analysis of the set of application domains comprises:
computing a pair of cache occupancy traces for each pair of application domains based on changes in cache occupancy; and
finding gain-loss swing patterns mirrored between the pair of cache occupancy traces for each pair of application domains.

12. The method of claim 11, wherein finding the gain-loss swing patterns mirrored between the pair of cache occupancy traces comprises taking a product $z_1$ based on the formula:

$$z_{i,j} = \begin{cases} \Delta x_{i,j} \cdot \Delta y_{i,j}, & \Delta x_{i,j} \cdot \Delta y_{i,j} < 0 \\ 0, & \Delta x_{i,j} \cdot \Delta y_{i,j} \geq 0 \end{cases}$$

where $$\Delta x_{i,j} = x_{i,j+1} - x_{i,j}$$

$$\Delta y_{i,j} = y_{i,j+1} - y_{i,j}$$

where $x_{i,j}$ and $y_{i,j}$ are $i^{th}$ occupancy samples in an $i^{th}$ window for a first application domain and a second application domain, respectively, in each pair of application domains.

13. The method of claim 12, wherein performing the pair-wise analysis of the set of application domains further comprises auto-correlating the gain-loss swing patterns mirrored between the pair of cache occupancy traces using an auto-correlation function.

14. The method of claim 13, wherein performing the pair-wise analysis of the set of application domains further comprises analyzing a Fourier transform of the auto-correlation function to identify the potential cache timing channel attack.

15. A system for defense against timing channel attacks, the system comprising:
a cache occupancy monitor configured to produce cache occupancy data tracking a number of cache blocks occupied by each of a plurality of application processes;
an occupancy pattern analyzer configured to analyze the cache occupancy data to identify a potential cache timing channel attack based on patterns of cache occupancy mirrored between application domains, wherein the potential cache timing channel attack is associated with a highest autocorrelation of the autocorrelations of cache occupancy of the pairs of application domains in respective time windows; and
a cache partition manager configured to partition cache access between a pair of application processes involved in the potential cache timing channel attack by assigning at least one of the pair of application processes to a separate cache partition, wherein each cache partition has a predefined cache ways accessible to a corresponding application process.

16. The system of claim 15, wherein the cache occupancy monitor is deployed on a combination of firmware and management layers operating on a processor.

17. The system of claim 16, wherein the occupancy pattern analyzer is deployed on an operating system operating on the processor.

18. The system of claim 15, wherein the cache partition manager comprises a way allocation manager to partition access to the cache blocks for the pair of application processes involved in the potential cache timing channel attack.

19. The method of claim 1, wherein performing the pair-wise analysis of the plurality of application domains further comprises:
computing a pair of cache occupancy traces for each pair of application domains based on changes in cache occupancy; and
finding gain-loss swing patterns mirrored between the pair of cache occupancy traces for each pair of application domains.

* * * * *